United States Patent [19]

Golay

[11] 4,060,713
[45] Nov. 29, 1977

[54] ANALYSIS OF IMAGES

[75] Inventor: Marcel J. E. Golay, Lutry, Switzerland

[73] Assignee: The Perkin-Elmer Corporation, Norwalk, Conn.

[21] Appl. No.: 595,795

[22] Filed: July 14, 1975

Related U.S. Application Data

[63] Continuation of Ser. No. 155,874, June 23, 1971, abandoned, which is a continuation-in-part of Ser. No. 803,004, Feb. 27, 1969, abandoned.

[51] Int. Cl.$^2$ ............................................. G06F 15/42
[52] U.S. Cl. ............................ 364/416; 340/146.3 F; 364/515
[58] Field of Search .............. 235/150, 152, 92, 151.3; 444/1; 340/146.3, 172.5

[56] References Cited

U.S. PATENT DOCUMENTS

| | | | |
|---|---|---|---|
| 3,106,698 | 10/1963 | Unger | 340/146.3 X |
| 3,106,699 | 10/1963 | Kamentaky | 340/146.3 X |
| 3,196,398 | 7/1965 | Baskin | 340/146.3 |
| 3,315,229 | 4/1967 | Smithline | 340/146.3 |
| 3,339,179 | 8/1967 | Shelton, Jr. et al. | 340/146.3 |

Primary Examiner—Edward J. Wise
Attorney, Agent, or Firm—S. A. Giarratana; F. L. Masselle

[57] ABSTRACT

In a method and apparatus for two-dimensional parallel data processing, a pattern of information to be analyzed is reproduced in a field of bi-stable information bearing elements. The pattern is processed by comparing the states of the six nearest neighbor elements around each element with at least one of the possible patterns of states of said six neighbor elements, without regard to correspondence of rotational orientation of the actual pattern with the possible patterns, and fixing each element in a predetermined state when the actual pattern of states of its six neighbors matches a selected one or more of the possible patterns. The predetermined state in which each element is placed may be a function of the states of its six neighbors, a function of its own original state and the states of its six neighbors, or its own original state. In order that the state of an element be fixed in relation to the original states of its six nearest neighbors, and not in relation to new states of the neighbors resulting from the processing, the field is adapted to be processed by designating subfield groups of three, four or seven elements in which no two adjacent elements in the field are in the same subfield and then by processing the respective subfield groups in succession. In a preferred form each element of the field consists of a line of subelements with the corresponding subelements of different elements being arranged in layers, such that the several layers of subelements are homologous. The subelements in each layer are interconnected with each other and with the corresponding subelements (of the same element) in the other layers, and each subelement of each layer is connected to control elements including an input data reader, an instruction bank, an evaluation unit and a program unit. The processing may thus include fixing subelements of one layer respectively in states which are functions of corresponding subelements in other layers.

16 Claims, 47 Drawing Figures

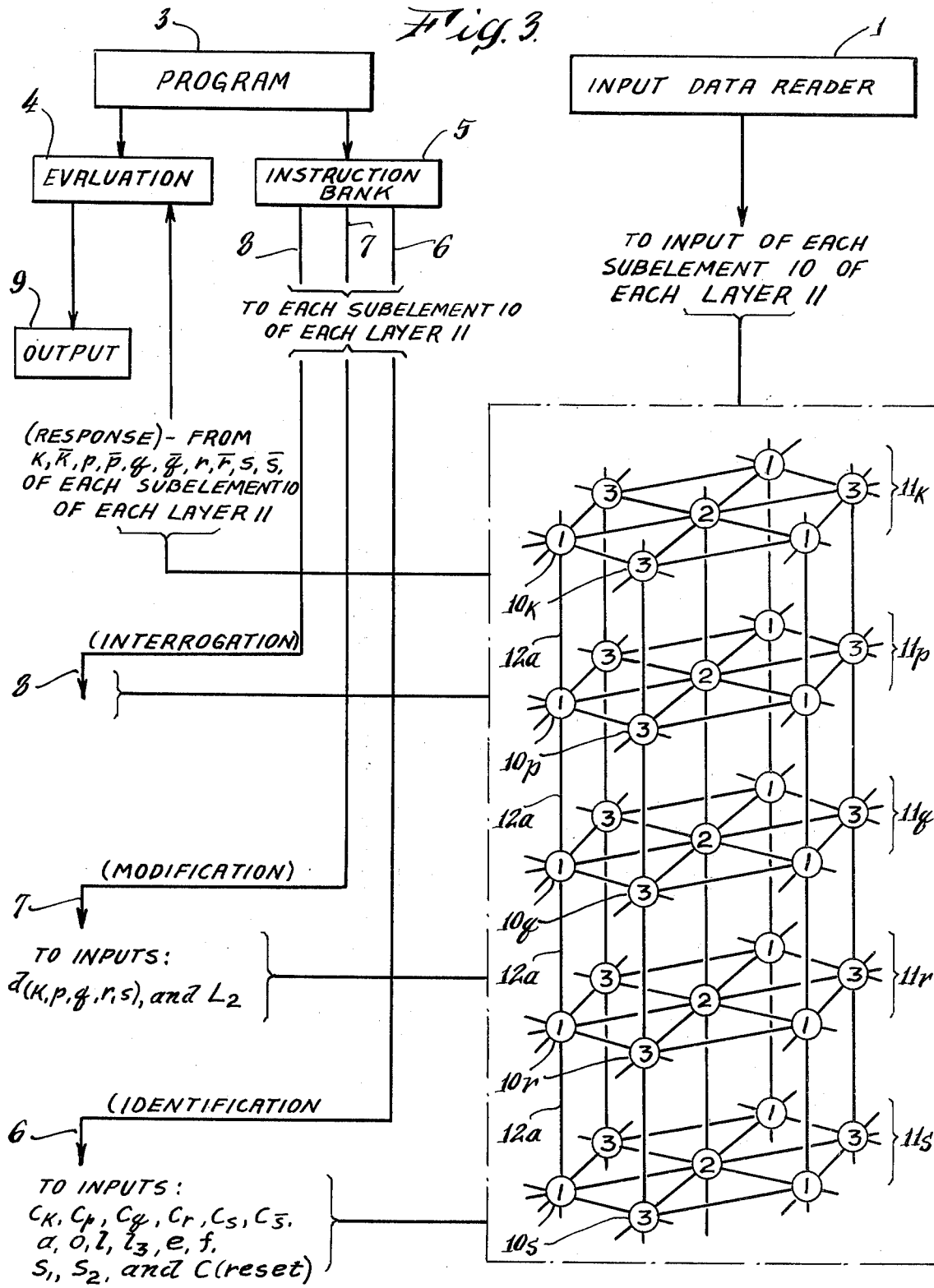

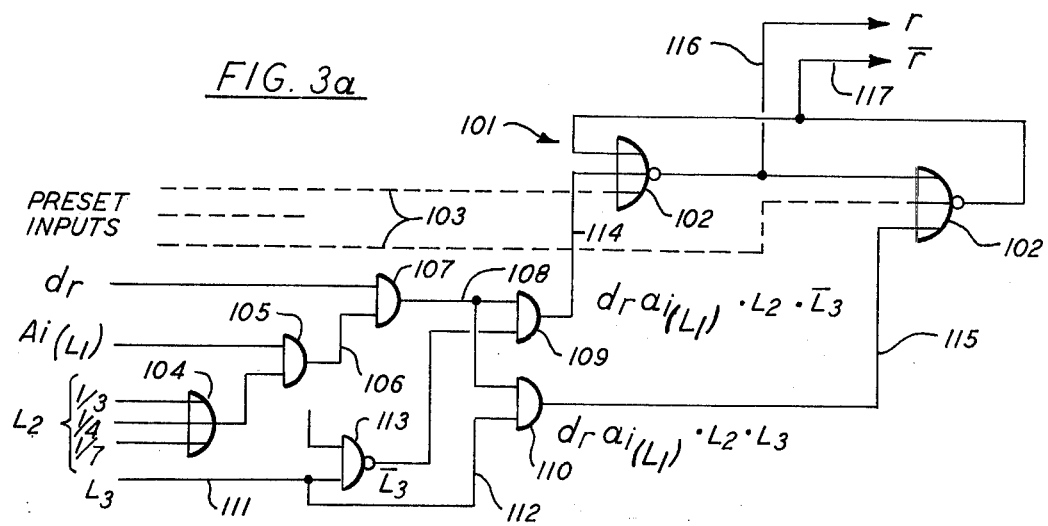
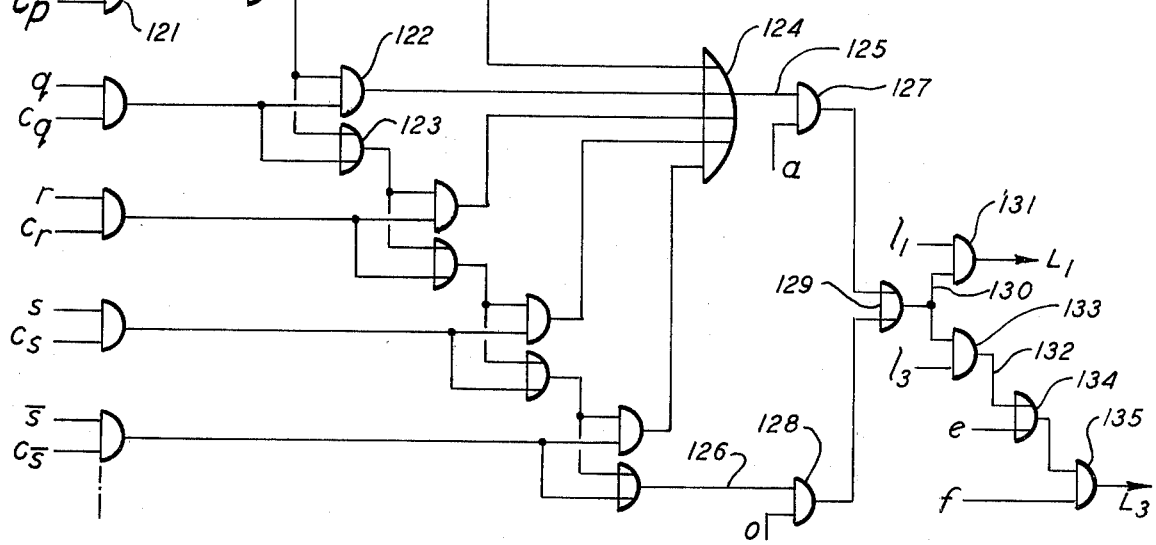
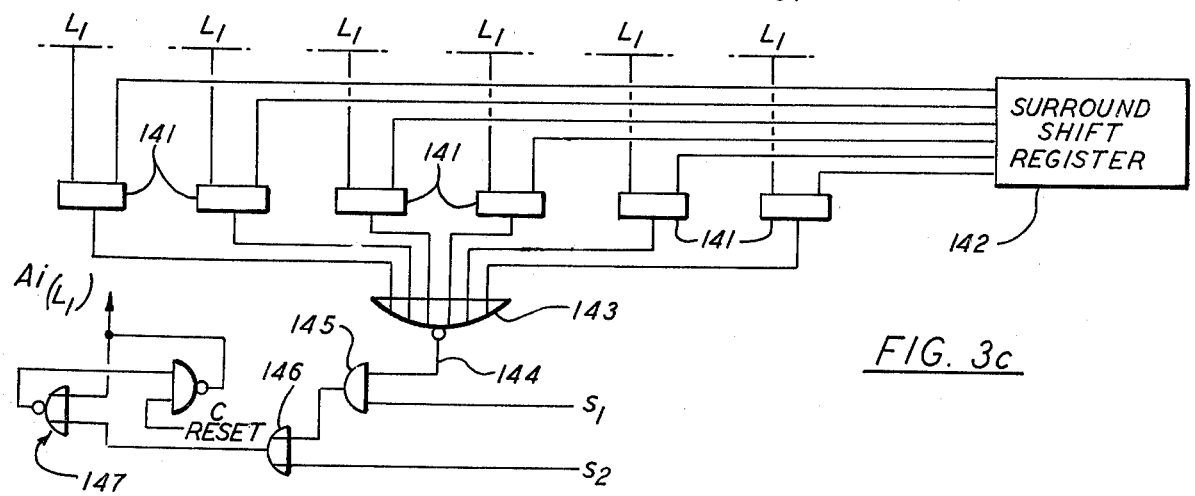

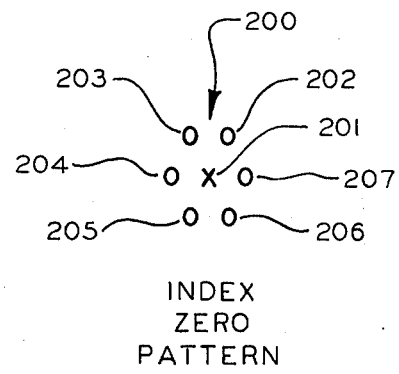

```
          ┌─200
203─┐  ┌─202
    o  o
204    ┌─201
   o x o ─207
205     ─206
   o  o
```

INDEX ZERO PATTERN

INDEX ONE PATTERN

INDEX TWO PATTERN

INDEX THREE PATTERN

INDEX FOUR PATTERN

INDEX FIVE PATTERN

INDEX SIX PATTERN

INDEX SEVEN PATTERN

INDEX EIGHT PATTERN

INDEX NINE PATTERN

INDEX TEN PATTERN

INDEX ELEVEN PATTERN

INDEX TWELVE PATTERN

INDEX THIRTEEN PATTERN

FIG. 5n

ANALYSIS OF IMAGES

RELATED APPLICATIONS

This is a Continuation of application Ser. No. 155,874 filed on June 23, 1971 which is a Continuation-in-part of application Ser. No. 803,004 filed on Feb. 27, 1969, both abandoned.

BACKGROUND OF THE INVENTION

This invention relates to data processing computers and more particularly to an improved method and apparatus for two-dimensional parallel data processing.

The concept of two-dimensional parallel data processing illustrated by the method and apparatus disclosed by U.S. Pat. No. 3,106,698 to Stephen H. Unger, greatly increases the speed and flexibility with which data can be processed as compared with apparatus in which data is processed serially bit by bit.

Two-dimensional parallel processing requires operation by a large number of commands on an even larger number of elements. In general, it is based on the informational content of each element and on its neighborhood of elements, the subsequent operations to be performed on each element being determined in accordance with the pattern of information contained in the neighboring elements.

The two-dimensional data processing method and apparatus of this invention is based on the evaluation of a given piece of information in terms of its own value and the values of the pieces of information surrounding it. A primary example of such processing is in photographic evaluation wherein the whiteness or blackness of a particular point is meaningful only in terms of its context. In fact, most photographic evaluations may be performed by determining the size and juxtaposition of significant regions of relatively constant light density. Another example of this type of processing is in the evaluation of cells taken from the human body or from animals used in medical research. In this type of evaluation, the size, shape and number of various types of cells is of critical importance.

Thus, the information which must be obtained from the two-dimensional data processor includes such items as the number of regions of a given size, the intersections between different types of regions, the size of continuous areas of similar informational content, etc. In general, this information can best be obtained from a system which is capable of providing information as to the interconnection of similar data points. In other words, the system must be able to "know" when a given piece of information is adjacent another similar piece of information; it must also be able to "know" whether the specific piece of information is simply one point of information included in a larger body of that information type or whether it is a unique point which connects two regions of similar information type and separates regions of different informational type, etc. A necessary concept for this mode of processing is that of "connectivity" of information. That is, it is important that the computer know whether or not a given piece of information contained in an element is necessary to maintain continuity between other similar bits of information in order to be able to carry out the basic processing procedures of shrinking, swelling, smoothing, outlining, or skeletonizing image areas, or of extending lines. Known systems based on the relation of the information in an element to information in neighboring elements around it in a square array involve an extremely high degree of complexity; each element must be able to determine the informational content of each of at least two different classes of neighbors—for example, four primary neighbors at the distance unity therefrom (unity being defined as the minimum distance between the points of a square array) and four secondary neighbors at the distance $\sqrt{2}$ therefrom—and the element must be able to change its own state differently, depending on whether the same pattern of information is contained in one or the other of these classes of neighbors.

SUMMARY OF THE INVENTION

A principal object of this invention is to avoid the foregoing complexity of operation and to provide a greatly simplified two-dimensional parallel data processing method, and apparatus particularly adapted for carrying out the method.

Briefly, this method of two-dimensional parallel data processing includes the steps of: reproducing a set of data in a two-dimensional field of bi-stable information-bearing elements; determining the pattern of information contained in six neighboring elements immediately surrounding each element; modifying the informational content of those elements in which the information is of a preselected type and for which the pattern of information content of the neighboring elements corresponds to a selected one of the several possible patterns, and reiterating these steps as necessary to obtain a new pattern of information from which a desired output is derived. Such a neighborhood of six elements around each element in accordance with this invention permits rapid processing of data in relatively few fairly simple steps which are capable of being carried out with fewer components and simpler circuitry than required for processing similar data by previously known methods. Specifically, with a neighborhood of six elements immediately surrounding another element there are a total of only fourteen different rotationally equivalent patterns of information content and in accordance with the invention comparison of a given pattern of information in such neighborhoods of six with the possible patterns is suitably made without reference to rotational orientation.

The bi-stable elements forming the field are arranged and connected in an array such that each of the elements (except those at the edge of the array) are interconnected with six neighbor elements which surround it and which are interconnected with each other. The neighborhoods thus defined are such that the interconnection between each element and its six neighbors and between the neighbors do not cross; this may suitably be provided by a lattice array of elements in which the six interconnected neighboring elements of each element (except the elements at the edge) surround it in a generally hexagonal arrangement, but any arrangement in which each element (except those at the edge) are interconnected with six neighboring elements around it would be satisfactory.

In apparatus for the practice of the invention, the bistable elements are connected into the apparatus so that the apparatus is adapted to distinguish between the situation in which an element must be in the same state as two or more of its neighboring elements in order for connectivity to exist between neighboring elements that are in the same state, and the situation in which the neighboring elements that are in a particular state are all adjacent so that the connectivity exists without regard to the state of the center element.

In order to avoid the logical difficulty which would arise if the computer had to determine if a particular neighborhood element is in its original state or has already been fixed in a new state with reference to its own neighborhood, the array of elements forming the processing field is divided into subfields such that no two adjacent elements in the field are in the same subfield, which therefore means that no two adjacent elements in any neighborhood group, consisting of an element and its six immediate neighbor elements, are in the same subfield. The processing field may be divided into either three, four or seven subfields and the number of subfields into which the field is to be divided for the processing sequence may be designated by an instruction from the instruction bank of the apparatus.

In accordance with the general concept of the invention each element of the field consists of a number, e. g., three or five, of subelements connected in a line and the subelements of each element in the same linear position are interconnected in a layer. Thus, the subelements in each layer are interconnected so that each one, except those on the edge, is interconnected with its six surrounding subelements as well as with its corresponding subelements in other layers. The instruction bank of the apparatus is connected to send instructions to all the subelements of any one of the layers, and to all the elements (i.e., all the subelements constituting the elements) of any one of the subfield groups, and is adapted to send instructions to the subfields of the selected subfield grouping in any desired sequence. The several layers of subelements may be separate layers, as illustrated and described herein or they may be areas of a single layer of subelements. Thus the processing may include the steps of determining the state of a corresponding subelement in another layer or area and then performing a modification step as a function of the state of the corresponding subelement. The states of the subelements are thus adapted to be modified or not in accordance with the state or states of one or more corresponding subelements in one or more other layers or areas so that the selection of the elements to be modified can be made both on the basis of the patterns of states of its six neighbor subelements in the same layer or area or of the state or states of the corresponding six neighbor subelements in one or more of the other layers or areas.

BRIEF DESCRIPTION OF THE DRAWINGS

FIG. 3 is a schematic representation illustrating the manner in which the subelements of the elements of the data processing field are interconnected and are connected to other components of the data processing system.

FIGS. 3a – 3c are schematic views of circuits included in each processing subelement of a processing field of this invention.

FIGS. 18a – 18c are schematic views illustrating the analysis of bubble chamber photographs by means of the present invention.

DETAILED DESCRIPTION OF THE PREFERRED EMBODIMENT

Figure 1:
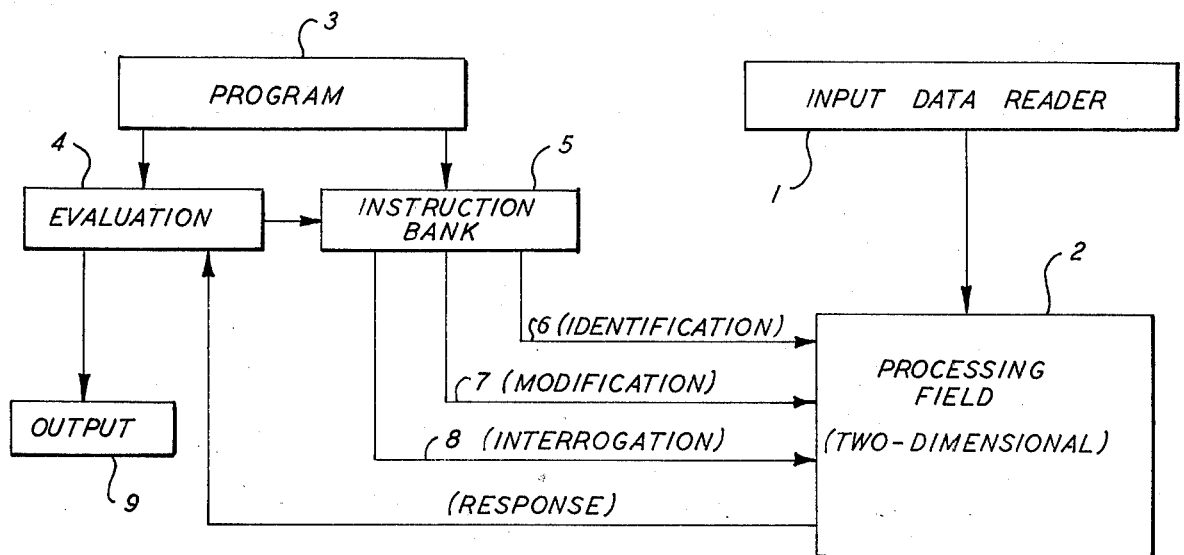
FIG. 1 is a schematic representation illustrating the major components of a data processing system in accord with this invention.

FIG. 1 illustrates in broad outline the major components of the processing system of this invention. Block 1 represents an input data transfer mechanism such as a Vidicon tube or a cyclical electronic reader for accepting input information and reproducing it in the processing field 2. A program 3 is prepared which controls an evaluation unit 4 and a bank of standard instructions 5. Processing is performed by successively identifying part of the field by connection 6, modifying all or part of the information by inputs along connection 7, determining its new condition by interrogation along connection 8 and evaluating the response to decide whether to perform further processing or provide an output via a readout means 9. The connections 6, 7 and 8 represent functions applied to the field; physically, these connections are groups of wires which carry signals to various specific parts in the field.

The present invention is directed to a novel processing field and to a new and improved mode of operation which is based on the capabilities of the novel field. The processing field of this invention, shown partially and schematically in FIGS. 2 and 3, comprises a plurality of elements 10 made up of vertical lines of subelements 10k, 10p, 10q and 10r (and 10s in FIG. 3), each of which subelements is capable of at least two stable conditions corresponding to different informational content. The corresponding subelements of the elements are arranged in homologous layers 11k, 11p, 11q and 11r (and 11s in FIG. 3). The subelements in each layer are interconnected within the layer and are each interconnected with corresponding subelements (of the same element) in other layers. The interconnections 12 provide for communication of informational content between subelements within each layer; the interconnections 12a provide communication of informational content between corresponding subelements in different layers. Preferably, the subelements 13 along the sides of each layer are of fixed content to simplify processing.

Figure 2:
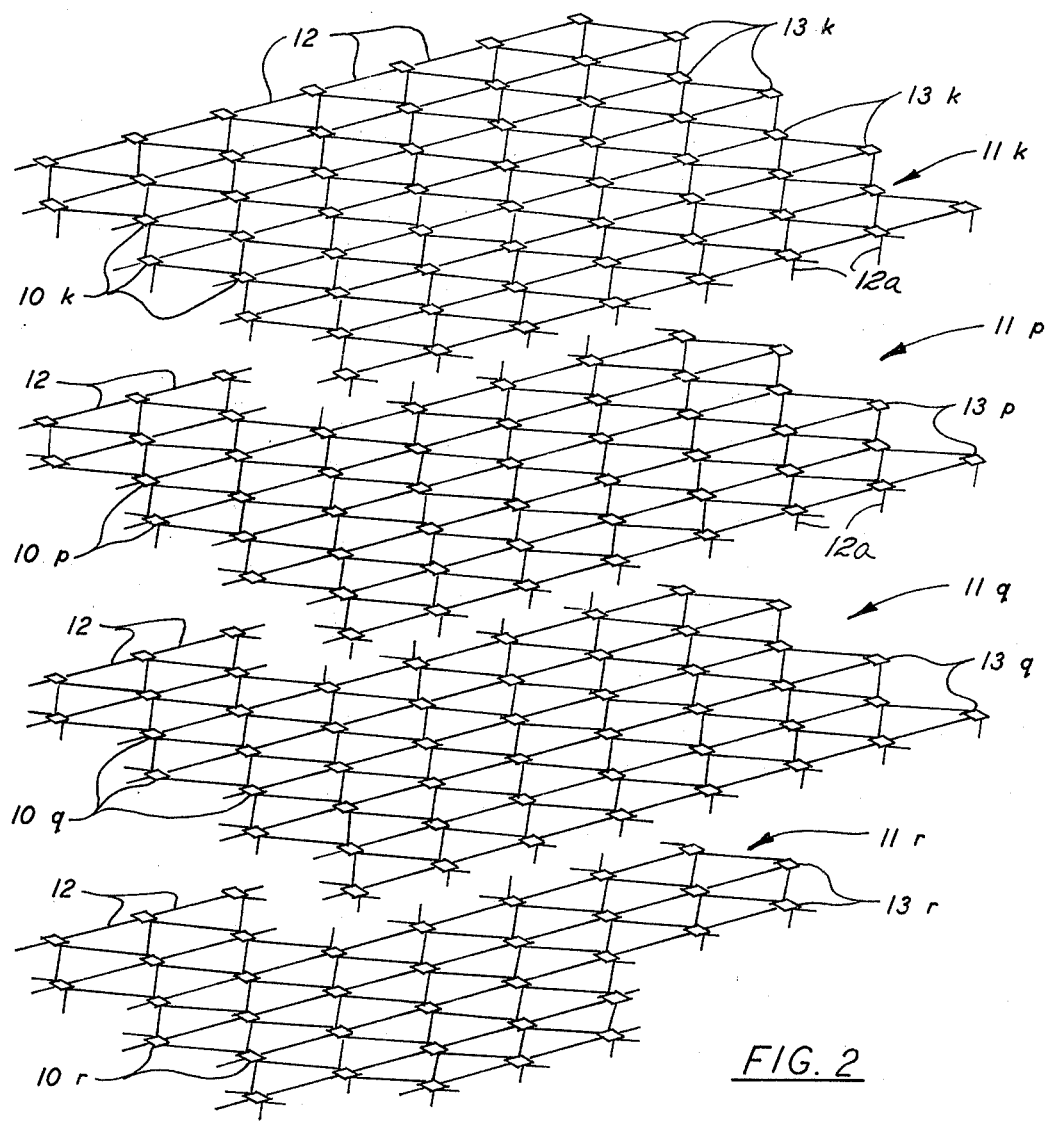
FIG. 2 is a schematic representation of a field of elements consisting of four layers of elements.

In FIG. 2, four layers 11, designated k, p, q and r, are shown. In the subsequent description of circuitry shown in FIGS. 3 and 3a – c, five layers, k, p, q, r and s are referred to. It will be understood, however, that any desired number of layers 11 may be provided.

The manner of processing information in accord with this invention is based on the concept of introducing two-dimensional information into one or more of the layers of the field and modifying the input information according to functions based on the condition of each piece of such information and also based on the conditions of neighboring pieces of information. To accomplish this, input information, such as a photograph, is converted into binary digital form, for example, on the basis of optical density, to produce a bit of information corresponding to each location in the input. The bit density is sufficient to provide the required detail in the eventual output. Bits of information derived from one optical density are applied to one or more layer of the over-all field and each subelement in a layer is placed in a 1 or 0 condition according to the corresponding bit.

Figure 5A:
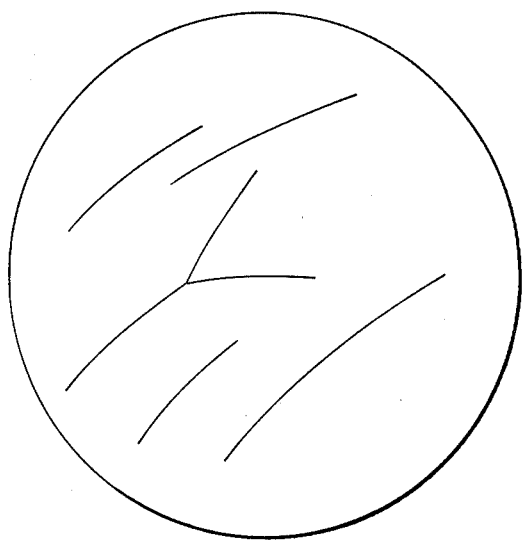
FIGS. 5a – 5n are representations of one rotational orientation of patterns of logic signals having indexes, 0–13, respectively.
Figure 5B:
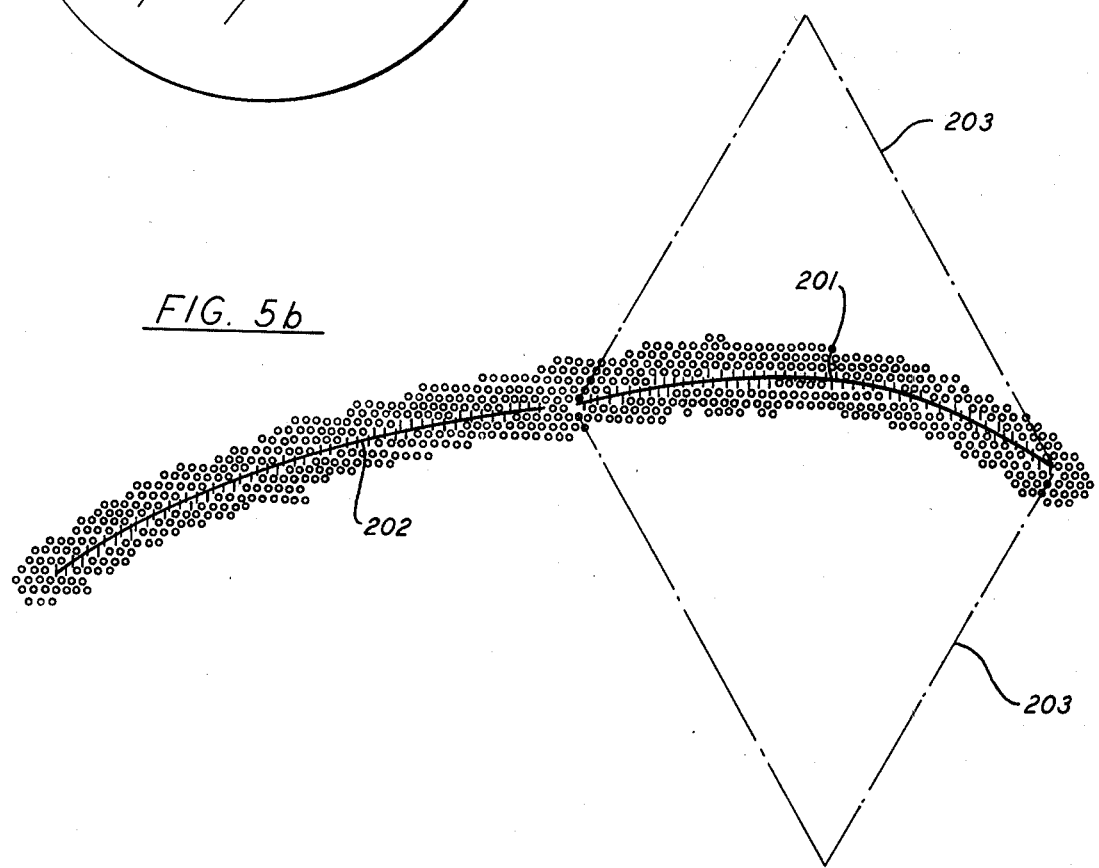
FIG. 5bb is a representation of another rotational orientation of the pattern of logic signals having the index, 1.
Figure 5C:
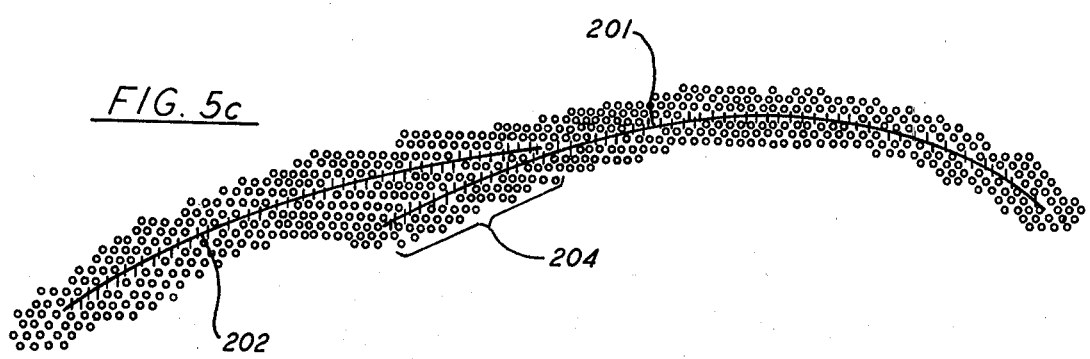

Two-dimensional processing operations performed on such information in accordance with a preselected program are accomplished by defining the kind of neighborhood pattern to which a particular instruction applies and issuing a modification order to all elements, or subelements of a designated layer, which have such a neighborhood. For example, as will be described hereinafter, it may be of interest to process regions of the field in which the same information appears at a large number of elements by determining the number of connected regions, by eliminating simple holes within connected regions, skeletonizing closed regions containing 1's or 0's, etc. To accomplish these operations, the possible patterns of information which may surround each subelement in a layer being operated on must be identified. This is done in accord with FIGS. 5a – 5n, wherein the "patterns" 200 correspond to the possible arrangements of subelements 202 – 207 of information around a subelement 201. Hereinafter, the presence of positive information is assumed to be indicated by the 1 condition; the absence of positive information by the 0 condition. In Table I below the weight associated with each index pattern is given.

TABLE I

| FIG. | Pattern | Weight | FIG. | Pattern | Weight |
|------|---------|--------|------|---------|--------|
| 6a | 0 | 1 | 6h | 7 | 2 |
| 6b | 1 | 6 | 6i | 8 | 6 |
| 6c | 2 | 6 | 6j | 9 | 6 |
| 6d | 3 | 6 | 6k | 10 | 6 |
| 6e | 4 | 6 | 6l | 11 | 6 |
| 6f | 5 | 6 | 6m | 12 | 3 |
| 6g | 6 | 1 | 6n | 13 | 3 |
|    |   | = 32 |    |    | = 32 |

The index is a distinguishing number assigned to each pattern so that specific patterns may be conveniently identified.

The weights indicate how many distinct similar patterns can be formed by merely rotating the pattern shown, and it will be noted that the sum of the weights of all patterns is $64 = 2^6$, i.e., the total number of possible patterns. The patterns 8 and 9 are the only asymmetric patterns. They can be obtained one from the other by mirror imaging and are kept as separate patterns in order to permit the distinction of clockwise or counterclockwise rotation. It is noteworthy that the number six is the minimum number for which a cyclical sense can be specified, by means of binits on a circle which read differently whether traversed clockwise or counterclockwise, this cyclical sense being specifiable by choice between one or the other of the single pair of mirror imaged patterns, 8 and 9.

The 64 possible patterns of 0's or 1's of the six elements forming the neighborhood, or surround, of an element are divided into a first set of 32 patterns in which there is at most a single group of adjacent 1's and a second set of 32 patterns in which there are more than one group of adjacent 1's, as shown on FIGS. 5a – 5g and in Table I. This classification provides the system of this invention with the capability of knowing when an element E is required for connectivity of information. The two sets of patterns are sharply separated by the concept of connectivity, for in the first set the addition or suppression of a 1 in the center cannot alter the connectivity of the 1's of its neighborhood, whereas it can in the second set. Thus, where connectivity invariant operations are concerned, shrinking or swelling operations will be defined to apply only to elements having neighborhoods of index 0-6, and not to others; other operations may be defined which apply to elements having neighborhoods selected on other criteria.

An important feature of the method of this invention is that 64 possible patterns are utilized without regard to orientation; if a neighborhood pattern being compared with the possible patterns has the same sequence of states as one of the possible patterns, it is considered equivalent to that pattern even though their rotational positions differ.

Thus, processing of information may be accomplished by identifying those neighborhoods of an element having a particular index, which determines whether a given operation is to be performed on the element. Certain operations will change both an element and its neighborhood, therefore, an instruction must be included to specify whether the operation is to be performed on the basis of the old or the new neighborhood of each element.

Figure 2A:
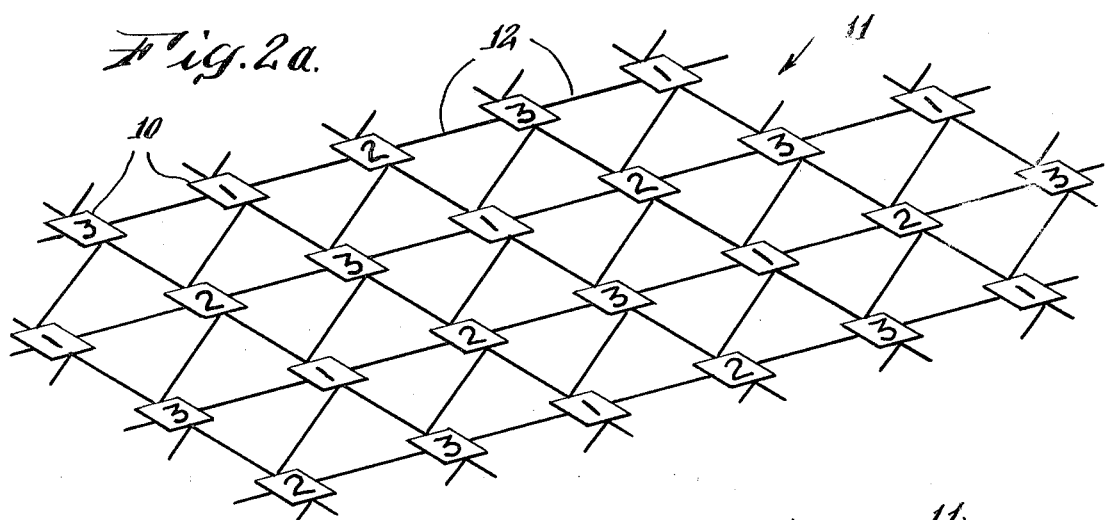
FIGS. 2a, 2b and 2c illustrate respectively the manner in which the processing field may be divided into three, four and seven subfields.
Figure 2B:
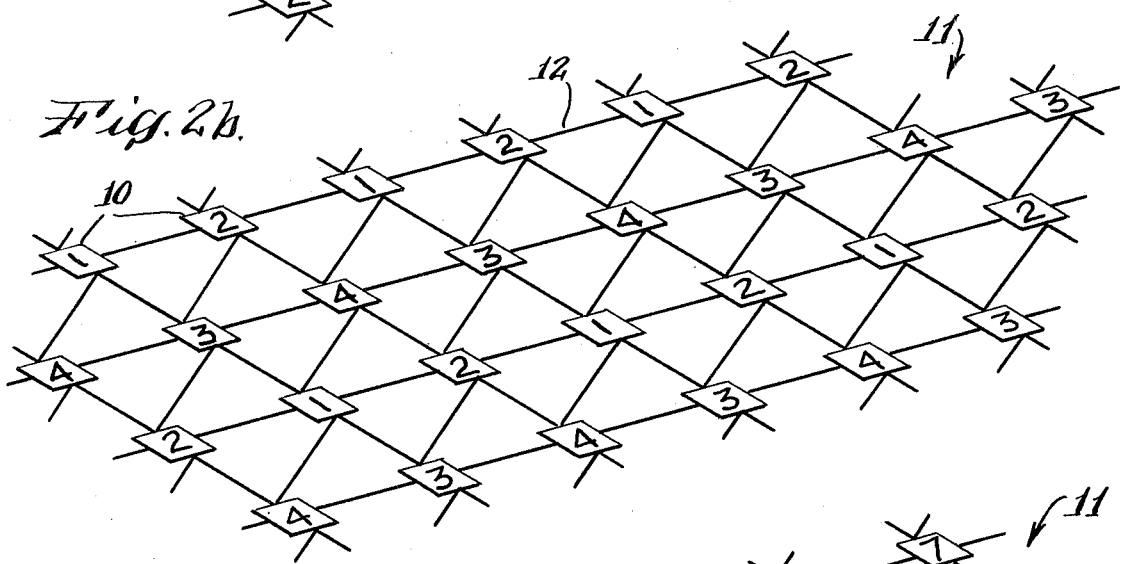
Figure 2C:
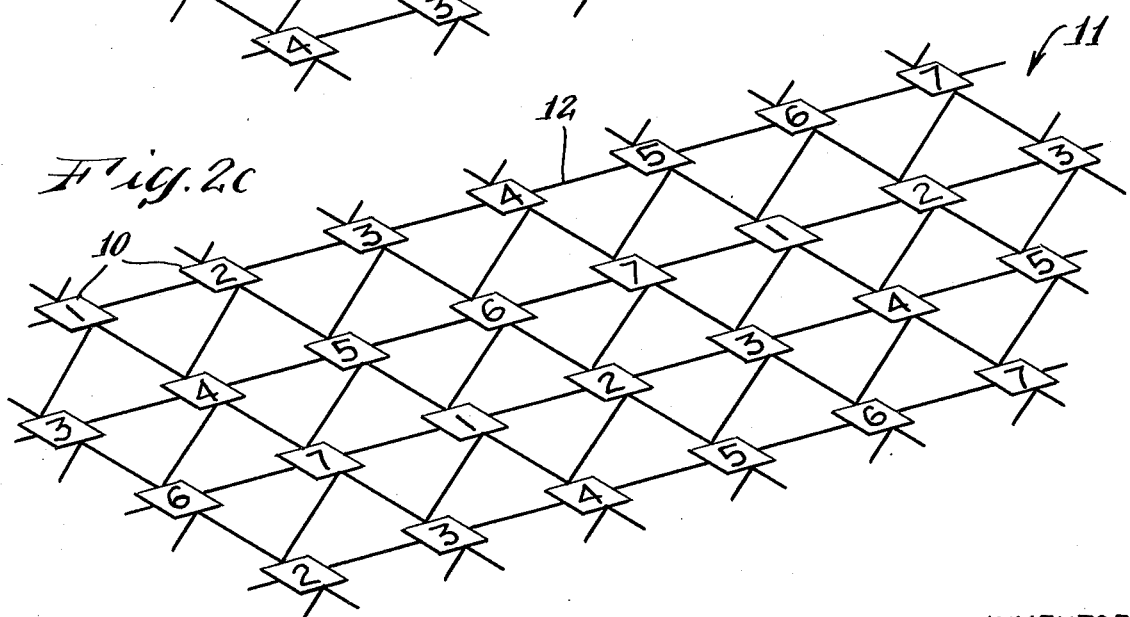

For this purpose the processing field of elements, and the portions of the field defined by separate layers, are divided into subfields such that no pair of adjacent elements in the field, or in any possible neighborhood group consisting of an element and its six surrounding neighbors, belong to the same subfield. As illustrated in FIGS. 2a, 2b and 2c, respectively, the field may be divided into subfields of three, four or seven elements. The number of subfields into which the field is to be divided for the processing of data is determined by the nature of a particular processing operation designated by a program which causes the instruction bank to issue the appropriate instruction to all the subelements which comprise each element.

In general the method and apparatus of this invention provide simple and effective means for carrying out various data processing operations, including basic types of processing operations such as shrinking, swelling, smoothing, outlining and skeletonizing image areas, and of extending lines. In practice a program is set up designating a general sequence of processing operations adapted to produce the desired result (e.g. measuring certain features of the nucleus of a white blood cell). Specific instructions for the program are then translated into a sequence of detailed instructions, which are suitably encoded on tape, and which are fed into the program unit 3 that issues commands to the instruction bank 5 and evaluation unit 4, to cause these units to issue to, or receive from, the field subelements specific signals representing predetermined set instructions or information that the instruction bank and evaluation unit are constructed to issue or receive.

A universal notation for processing operations adapted to be carried out in accordance with the invention is as follows:

$$M_{a_0 a_1 a_2 \ldots a_{13}} [r_{n+1} = d_r \cdot a_{i(L_1)} \cdot L_2 \cdot L_3 + \overline{d_r \cdot a_{i(L_1)}} \cdot L_2 \cdot r_n]$$

In this notation the term M followed by the subscripts $a_0, a_1, \ldots a_{13}$ serves to identify the bracketed equation which follows as an operator and the subscrips designate the neighborhood patterns of the respective elements for which the operation is to be performed. The subscript "a" is actually unnecessary so that an M term to indicate operations for elements of neighborhood patterns having index numbers 1, 2 and 3, for example, would suitably be written $M_{1-3}$.

When a specific form of the foregoing general notation is written before a particular processing operation, division of the field into subfields (of 3, 4 or 7 subelements, as above) is performed for the designated processing operation, and the subfield group selected is suitably designated by a superscript of M, e.g. $M^3$, $M^4$ or $M^7$.

The equation within the brackets describes the condition of each element as it is affected by the operations designated. The explanation of the terms of the equation is as follows: $r$ is the subelement, $r$ in this instance, being operated on; the subelements are identified by the layer which they are in so that the letters $k, p, q, r$ or $s$, indicate both the layers and the subelements therein.

$n+1$ and $n$ (subscripts of $r$) indicate the number of operations which have been applied to the subelement; $n+1$ on the left indicates the new state (0 or 1) of the subelement after the operation, n indicates the original state.

$d_r$ is the layer, $r$ in this instance, in which the operation is to be performed; $d_r$ is given the value 1 for all subelements in the designated layer while the comparable d designations, such as $d_k, d_p, d_q$ and $d_s$, for the other, non-designated, layers are given the value 0.

$a_{i(L_1)}$ is an expression whose value (1 or 0) in the equation is dependent on whether the pattern of states ($L_1$) of the six neighbor elements of the element being considered matches one of the neighborhood patterns of states (i) designated by the subscript of M. $i$ refers to the index number or numbers of neighborhood pattern or patterns designated; $L_1$ is a logical function of the state of one or more the subelements which constitute the neighborhood of the subelement under consideration. Each subelement is connected to receive the $L_1$ function from each of its six neighbors and $i(L_1)$ is the index of the pattern of $L_1$ functions received from those neighbors. Thus in the equation of any specific notation for a particular processing operation, $a_{i(L_1)}$ has the value 1 if the pattern of neighbor $L_1$ functions matches the neighborhood pattern designated by the subscript of M.

$L_2$ is the subfield grouping (three, four or seven) into which the field is to be subdivided for a particular operation. It is designated by the program and communicated to the elements by the instruction bank. The instruction bank is adapted to communicate a 1 signal to all the elements (i.e., to all subelements) of the designated subfield group in sequence. That is, if the grouping into three subfields is designated, the instruction bank sends an $L_2$ equals 1 signal first to one third of the elements of the group, while leaving $L_2$ equal to 0 for the other two thirds and then sends a similar signal in sequence to the second and third thirds.

$L_3$ is the new state of the subelements of the designated layer which meet the selecting conditions, i.e., those subelements for which the pattern of the $L_1$ functions received from their six neighbor elements match the pattern or patterns designated by the index number subscript of the M term, and which are in the subfield designated by $L_2$. $L_3$ is 0 or 1; it may be defined by the program or it may be a function of one or more of the states of corresponding subelements of the element being operated on. In any case, for those subelements which meet the selecting conditions, the new state ($r_{n+1}$ of subelement $r$) is the same as $L_3$ since the second term of the right hand side of the equation (i.e., $\overline{d_r \cdot a_{i(L_1)}} \cdot L_2 \cdot r_n$) is zero. For the subelements which do not meet the selecting conditions, the first term on the right hand side of the equation becomes zero, so that the equation becomes $r_{n+1} = 0 \cdot L_3 + 1 \cdot r_n$ from which it is apparent that for the subelements which do not meet the selecting conditions $L_3$ is cancelled out and the subelement is left in its original state.

Figure 3D:
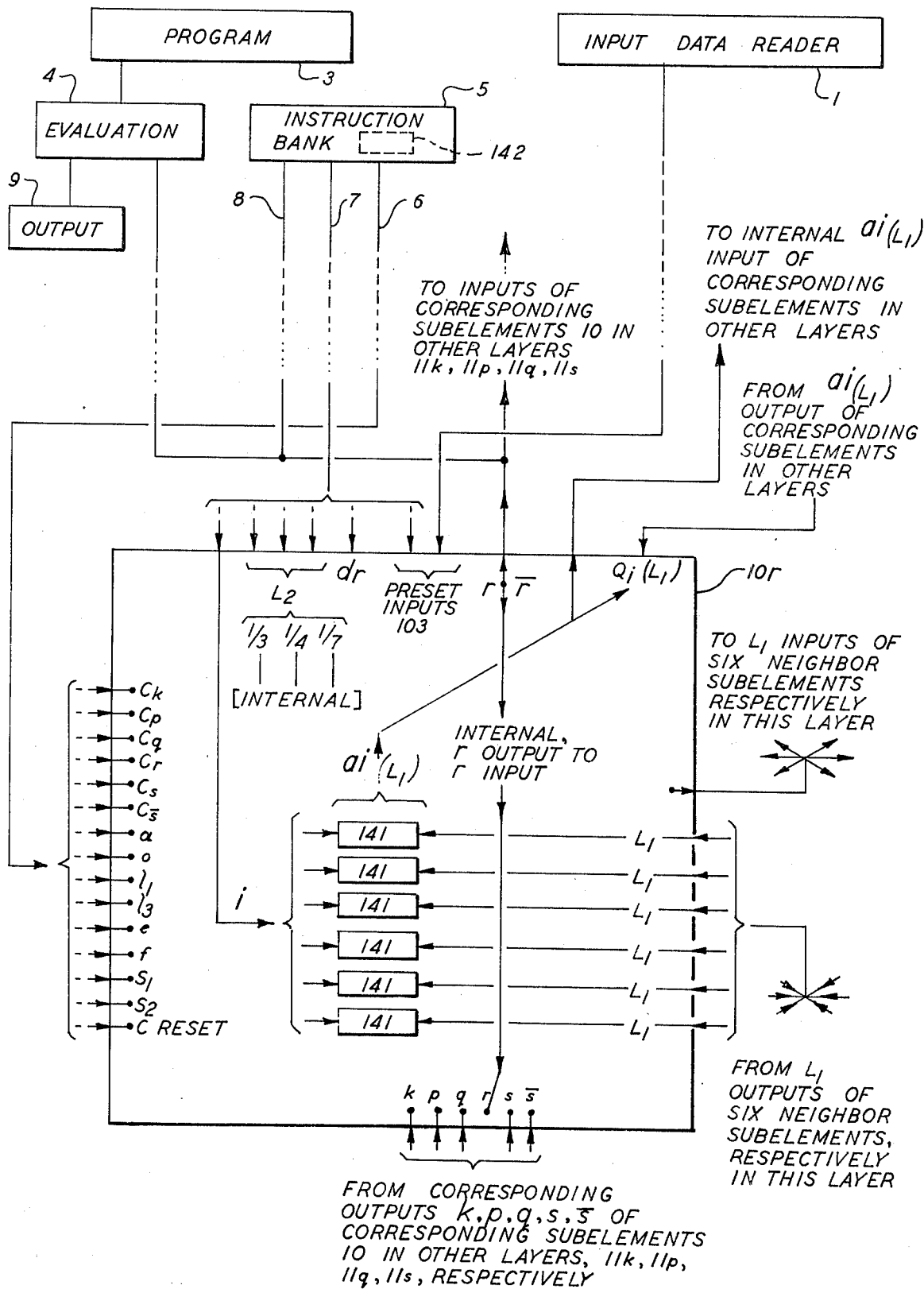
FIG. 3d is a schematic illustration of a typical subelement of the processing field incorporating the circuits shown in illustrating FIGS. 3a – 3c, illustrating the input and output connections by which each subelement is connected to other subelements in the same layer, to corresponding subelements in other layers and to control components of the system.

A suitable electronic configuration for the elements and subelements to carry out specific processing operations in accordance with the present invention is illustrated in FIGS. 3, 3a, 3b and 3c. FIGS. 3a, 3b, 3c and 3d show the different sections of circuitry incorporated in each subelement 10, illustrated as being a subelement 10 in the layer 11r, and the inputs and outputs of the subelements. FIGS. 3 and 3d illustrate the connections between the subelements 10 within each of five layers 11, k, p, q, r and s, between corresponding subelements in the respective layers and the connections of the subelements to other components of a data processing system.

FIG. 3a shows the section of circuitry for the ultimate processing level of a subelement 10, wherein the combination of functions defined by the notation for a processing operation takes place and wherein the condition of the subelement, which represents the informational content, is retained. The state (0 or 1) of the subelement is stored in the double stability circuit 101, i.e. a bi-stable device shown at the top of FIG. 3a which comprises a pair of NOR gates 102, 102'. Depending on the various inputs applied, this circuit produces a pair of outputs, $r$ and $\bar{r}$, corresponding to the positive and the negative of the informational content of this subelement. Information from the output $r$, is fed to the element's own input $r$ (FIG. 3b) and to the $r$ inputs of corresponding subelements in other layers as well as to he instruction bank 5 and evaluation unit 4 of the apparatus. Note that the cross-connection between each output and the preset inputs 103 of the opposing half of the circuit, shown in dash lines, retains the circuit in a given state until it is changed by the arrival of a different value from the processing circuit. These inputs 103 are connected to the input data reader (FIGS. 1 and 3) and are used initially to place an input image into the layer by connections to the input data reader 1; they may also be used to introduce additional information during processing.

The particular layer 11 in which a particular processing operation is to take place is designated by a ONE signal from the instruction bank 5 via line 7 in parallel to the $d_{(k,p,q,r\ or\ s)}$ inputs of all the subelements in that layer; 0 signal is sent to the d inputs of all the subelements of the other layers.

The $a_{i(L_1)}$ input is a local input formed within the subelement itself and comes from the section of circuitry illustrated in FIG. 3c. The formation of $a_{i(L_1)}$ is subsequently described in detail.

The $L_2$ input lead to an OR gate 104 of each subelement in each layer is connected to receive signals from the instruction bank 5 via line 7 for initiating a processing step in the elements 10 (i.e., in the particular subelements of a layer in which a processing operation is being carried out) of a particular subfield grouping of elements selected by the program. In FIG. 3 the numbers within the circle, which represent the subelements, indicate a subdivision of the field of elements into three subfields. For operating in the designated subfield the instruction bank would send a ONE signal in parallel to all the elements in one subfield and then, in succession, send a ONE signal in parallel to all the elements in the other subfields.

For this purpose, the instruction bank suitably includes series of busses for making alternative connections to each element (i.e., to the subelements in the several layers comprising each element) in one or the other of the subfields. Busses are provided for each subfield of the 3, 4 or 7 subfield groups and the instruction bank is wired to send, in accordance with a program command a signal to the appropriate $L_2$ inputs of the subelements of the field for designating the subfield grouping to be utilized; the instruction bank is also constructed to send actuation signals first to all the elements in one subfield group, and then, after a timed interval, to another subfield of the designated group and so on until all the elements have been actuated. In addition, the instruction bank is wired for a program instruction to designate the order in which the subfields are to be operated upon.

Any output from the $L_2$ OR gate 104, together with a signal, if any, from the function $a_{i(L_1)}$ input are applied to and AND gate 105. A voltage appears on line 106 from the AND gate 105 only if this subelement is in the selected subfield and if the pattern index of its six neighbor subelements corresponds to one of the pattern indices specified by a program instruction, i.e., by M term subscripts. When a ONE signal voltage is applied to the $d_r$ input, designating the $r$ layer as the one in which the processing step is to be carried out, and when there is voltage on line 106, an AND gate 107, which is connected to the $d_r$ input and to line 106, produces a ONE signal in its output line 108. As shown this line 108 is connected to two AND gates 109 and 110. Gate 109 is connected to receive a signal from a NAND gate 113, which in turn is connected to receive a signal from the $L_3$ input over line 111. Gate 110 is connected via line 112 to receive an input from line 111 connected directly to the $L_3$ input.

The $L_3$ input, like the $a_{i(L_1)}$ input is a local input formed within the subelement itself and comes from the section of circuitry subsequently described with reference to FIG. 3b.

The output of the AND gate 109 passes to NOR gate 102 over line 114; the output of AND gate 110 passes to the other NOR gate 102' over line 115.

Whenever $d_r a_{i(L_1)} \cdot L_2$ is 0, the outputs of both AND gates 109 and 110 are 0 so that the submodule is left in its original state. On the other hand, whenever $d_r a_{i(L_1)} \cdot L_2$ is ONE and $L_3$ is also ONE gates 109 and 110 will be 0 and ONE respectively; but if $L_3$ is 0 when $d_r a_{i(L_1)} \cdot L_2$ is ONE gates 109 and 110 will be 1 and 0, respectively. Thus the informational content appearing at outputs $r$ and $\bar{r}$ correspond to the state defined by the function $L_3$; if the subelement is not of one of the elements in a subfield portion being operated on, and/or if the pattern index of the states of its six neighbor elements do not match a designated pattern index, the lines 114 and 115 are at the 0 signal level and the subelement remains in its original state.

FIG. 3b shows the area of the circuitry in each subelement in which the functions $L_1$ and $L_3$ are formed. The same circuit is suitably utilized for forming both since, in general, for each successive operation $L_1$ is formed first, then $a_{i(L_1)}$ is formed in the area of circuitry illustrated in FIG. 3c (in the manner subsequently), and finally $L_3$ is formed.

The inputs of the circuitry area shown in FIG. 3b are: k, p, q and s from the corresponding subelements of other layers 11 and from its own "r" output from the circuitry area illustrated in FIGS. 3a and 3d, $c_k, c_p, c_q, c_r, c_s, c_{\bar{s}}, a, o, l_1, l_3, e$ and $f$ from the instruction bank via line 6.

Assuming that layer $r$ is the one designated for a processing operation, the input to line $r$ is the present state of this subelement $r$ while, $k$, $p$, $q$ and $s$ are, respectively, the states of the corresponding subelements in the other layers. As represented by the $s$ input, the negative states of one or more subelements may also be included. Each of these inputs is applied to an AND gate 121 along with a control signal, $c_k$, $c_p$, $c_q$, $c_r$, and/or $c_s$, by means of which a program instruction designates those inputs which are to be included in the function being formed. The input signals selected are applied to a succession of AND gates 122 and OR gates 123. The outputs of all of the AND gates are applied to an OR gate 124. By means of this interconnection, appropriate combinations of these inputs can be obtained by pulsing the control signal for the inputs required. The output at line 125 is then the AND function of the selected inputs and the output at line 126 is the OR function of the selected inputs.

The function $L_1$ or $L_3$ is formed by an instruction from the instruction bank applying a ONE signal voltage either to the "$a$" input to AND gate 127 or to the 0 input to AND gate 128 and by applying a ONE signal voltage to input $1_1$, to form the $L_1$ function or a ONE signal voltage to input $1_3$ to form the $L_3$ function.

The output from either gate 127 or 128 applies to an OR gate 129 and thence by line 130 to AND gates 131 and 133. Control input $1_1$ applies to gate 131; control input $1_3$ applies to gate 133 and any signal from gate 133 passes over line 132 to an OR gate 134, the output of which is applied to an AND gate 135. If for a particular processing operation it is desired to have $L_3$ equal to ONE rather than being a function of the states of various subelements, the $e$ input to OR gate 134 is activated. If $L_3$ is to equal 0, neither the "$c$" control signals nor the "$e$" input are activated so that output from gate 134 is a 0 signal. The AND gate 135 and the input $f$ are used to control the timing of the $L_3$ output from the circuit area shown in FIG. 3$b$ to the $L_3$ input shown in FIG. 3$a$.

As a further illustration of the manner in which the foregoing control signals are applied, if it is desired to form $L_1$ equals $p$ and $q$, a ONE signal is applied to the $c_p$, $c_q$, $a$ and $l_1$ inputs. For forming $L_1$ equals $k$ or $r$, a ONE signal voltage is applied to the $c_k$, $c_r$, $o$ and $l_1$ inputs. To have $L_3$ equal $r$ and $\bar{s}$, a ONE signal voltage is applied to the $c_r$, $c_{\bar{s}}$, $a$, $l_3$ and $f$ inputs. When $L_3$ is to equal ONE, a ONE signal voltage is applied to the $e$ and $f$ inputs.

FIG. 3$c$ illustrates the circuitry area of the subelement in which the function $a_{\bar{i}(L_1)}$ is formed, being formed on the basis of the $L_1$ inputs received from the $L_1$ outputs of its six neighbors. Specifically, the six $L_1$ inputs, in a predetermined order representing a geometrical neighborhood pattern, are applied, respectively, to six modulo 2 adders 141 for comparison with one or more of the neighborhood patterns designated by a program instruction and identified by the index number subscripts of the term M.

For this purpose the index patterns to be used in accordance with a program instruction are applied in succession to a shift register 142 in the instruction bank. On an instruction from the instruction bank to each subelement in the designated layer the index pattern from the register and the inputs from the $L_1$ inputs of respective subelements in the designated subfield and layer are fed to the modulo 2 adders, the index pattern from the instruction bank being fed to an input (FIG. 3$d$) of each subelement. A match of the neighborhood pattern with an index pattern is not dependent upon orientation, therefore the shift register rotates the pattern around the number of times necessary to determine if there is a match. Thus patterns of index numbers 1 to 5 and 8 to 11 will be rotated and fed in their new rotational position five times after the initial feeding to the modulo 2 adders, the index 7, pattern will be rotated and fed once, and the index patterns 12 and 13 will be rotated and fed twice. At each feeding of each rotational position of an index pattern and the $L_1$ inputs to the adders, a clock impulse from the instruction bank feeds a ONE signal voltage to the $s_1$ inputs of the respective subelements. After one index pattern has been rotated through the adders, the next designated index pattern is fed to the shift register and so on until each of the designated index patterns have been applied.

The modulo 2 adders are connected to a six-fold NOR gate 143 and, if a particular rotational position of an index pattern matches the pattern of the $L_1$ inputs (i.e., the $L_1$ inputs correspond exactly to the six inputs received from the shift register), the NOR gate 143 produces an output; if there is no match, it does not. If there is a match, the output from gate 143 over line 144 to an AND gate 145 combines with the clock pulse signal to gate 145 from input $s_1$ so that the result signal from AND gate 145 to an OR gate 146 passes to a double stability circuit 147 and forms the function $a_{\bar{i}(L_1)}$ which passes to the $a_{\bar{i}(L_1)}$ input to a gate 105 of the subelement circuitry area shown in FIG. 3$a$ of the subelement in which this $a_{\bar{i}(L_1)}$ function is generated, as well as to all the corresponding subelements in the other layers which comprise a complete element. An input $s_2$ to the OR gate 146 is provided to actuate the OR gate 146 on a signal from the instruction bank if all neighbor patterns of all index numbers are to be utilized in a particular processing operation, in which case the pattern matching need not be applied. The input $c$ is an automatic signal from the instruction bank issued after a completion of a complete matching operation, or the actuation of input $s_2$, and serves to reset the double stability circuit 147 to 0.

Each subelement of each element 10 in the field in accord with the present invention will include circuits such as illustrated in FIGS. 3$a$, 3$b$ and 3$c$, or comparable circuitry for carrying out the functions described, and will be incorporated in a computer or data processing system in the manner illustrated schematically in FIG. 3. FIG. 3$d$ further illustrates the external connections to and from a typical subelement, showing the interconnections with other subelements, in the same and other layers, and with the control components of the system. As indicated the system includes signal carrier means interconnecting the various outputs within each subelement interconnections between subelements in the same layer and to corresponding subelements in other layers and to control, interrogation and evaluation elements in the instruction bank and evaluation units which are controlled by coded instructions from the program unit. The circuits and components utilized may be structurally conventional and may be adapted to accept an input of given form, such as Fortran language, and produce voltage pulses which correspond logically to it. The circuits and components illustrated will, of course, include conventional power supplies and amplifiers as may be required.

The information obtainable from the two-dimensional field of elements illustrated includes such data as the number of input regions of various specific sizes, the number of closed or open lines of similar informational content, intersections between overlapping regions, etc. In many instances, this information may be obtained by asking the field for the number of elements which, with their neighbors, are in a given condition, shrinking or expanding the regions of interest and then repeating the question to determine the effect of the shrinkage or expansion.

The method and apparatus of this invention is particularly adapted for analyzing information which is in the form of patterns in which the areas of interest and other areas can be differentiated in some suitable way, as by being on one or the other side of a selected threshold between light and dark, so that one type of area may be represented by a 1 state of a bistable element or subelement and the other by a 0 state. Blood cells in a blood sample or light or dark areas indicating elements of interest in aerial photographs are examples of the type of information which may be analyzed.

In setting up a program for analyzing a pattern of information, the information of interest is differentiated with reference to a defining threshold and the resulting pattern is read into one of the subfield layers. The subfield group ($L_2$) to be utilized is selected and a sequence of notations, based on the above-described universal notation, for performing specific operations are set up in a sequence to process the input pattern in the appropriate manner to produce the output information desired. The specific instructions for carrying out a program step will thus consist of the selection of the field layer, $d_{(k, p, q, r \text{ or } s)}$, in which the processing is to take place, the subfield group ($L_2$), the sequence in which each portion of the designated subfield is to be operated upon, and the specific processing operations to be performed in accordance with instructions derived from processing notations for this specific processing operations. For some processing steps, or as part of a program as a means of preserving information of interest developed at some stage of the processing, additional layers are utilized and in these cases, the additional layers are set forth in the adaptation of the particular processing notation from the universal notation. The particular neighborhood pattern index or indexes required for a particular processing operation appear in the processing notation and are included in the program instructions. As in conventional data processing systems notations for the desired processing operations are translated into coded instructions which are applied by the program unit to the instruction bank to cause the instruction bank to issue appropriate command signals to the subelements, and/or to the evaluation unit, for carrying out the processing operations.

Two elemental operations in pattern analysis are shrinking (or emptying or skeletonizing), which means shrinking solid areas or blobs of 1's (or 0's) to a single 1 and elongated areas to a skeletal line of 1's, and swelling (or filling) which means enlarging and rounding out a blob.

Shrinking is defined by the notation $M_{1\text{-}3}{}^3 [k = \overline{a_{i(k)}} \cdot k]$. The superscript, 3, of the term M indicates that this operation is to be carried out utilizing subfields of three (FIGS. 2a and 3). Also, if the operation is to be repeated a specific number of times, the number is suitably given by a second subscript of M after the index number, but in the absence of such a second subscript, the operation will be repeated until no further changes occur in the layer indicated ($k$ in this instance), which is the usual case. Thus in accordance with this shrinking notation, when $a_{i(k)}$ equals 1 for any subelement $k$ in layer $k$ in the successive subfield operated on which has the neighborhood pattern index 1, 2 or 3, that subelement in placed in state 0; otherwise, when $a_{i(k)}$ equals 0, that subelement is left in its original state. By repeating this operation until no further changes occur in layer $k$ — that is, until $a_{i(k)}$ equals 0 for all subelements k, all simple blobs in layer $k$ will have shrunk to a single 1, while blobs with holes, such as rings, figure eights, rings within rings, etc. will have been reduced to one or more loops of thinness unity.

Figure 6:
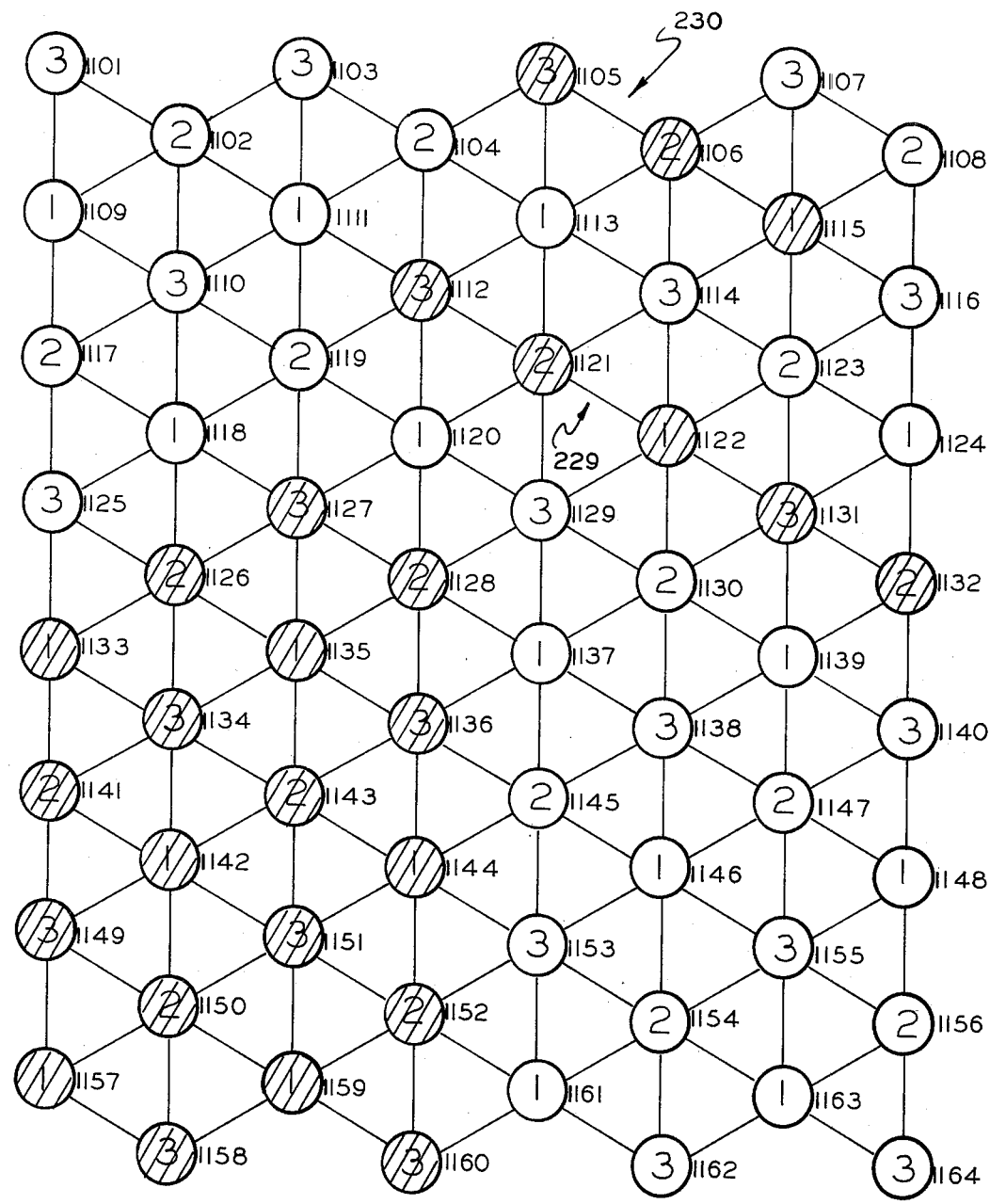
FIG. 6 is a schematic diagram of a signal plane which is comprised of outputs of bistable devices, each output having one of three subfield designations.
Figure 7:
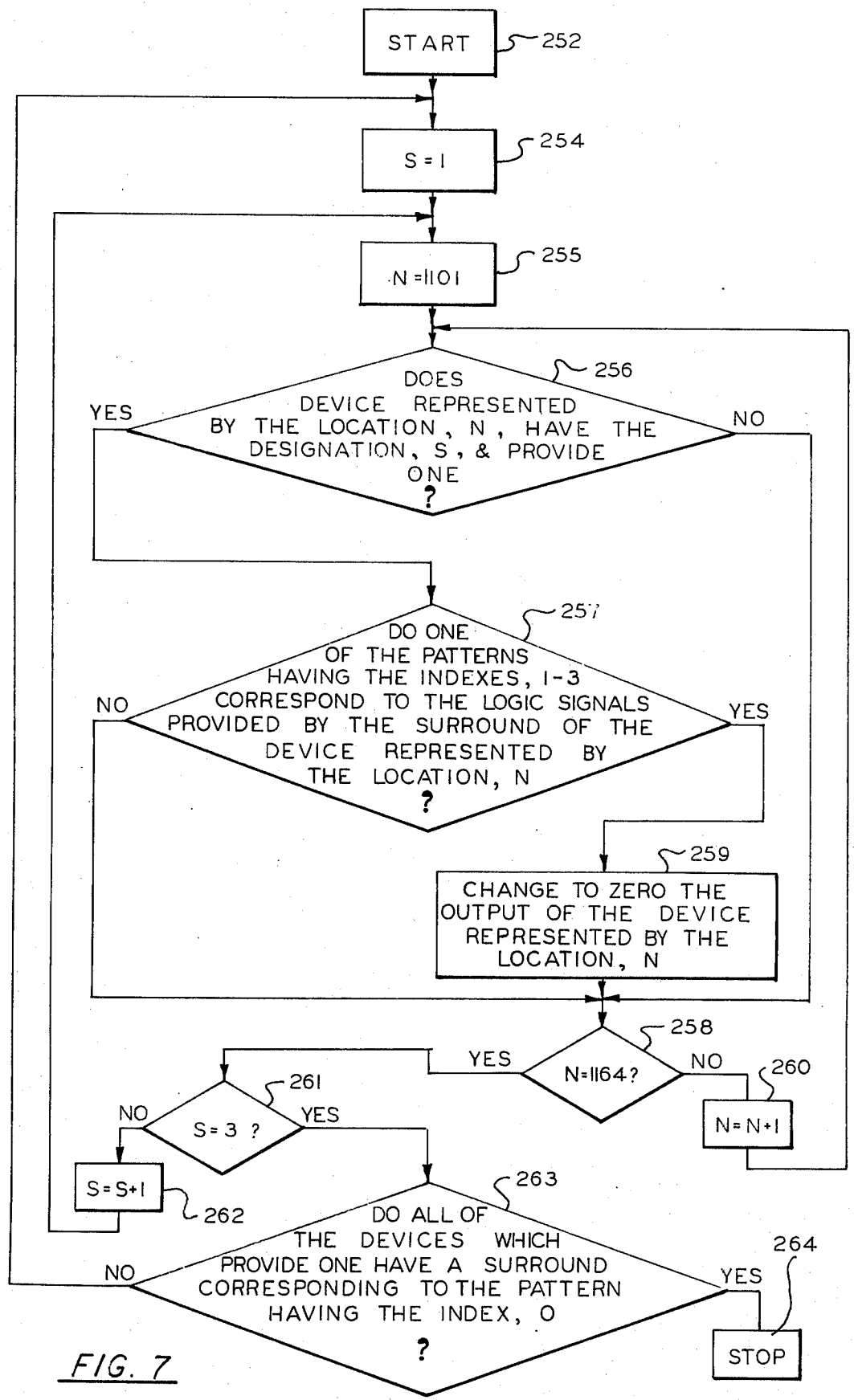
FIG. 7 is a logic flow diagram of a computer program for providing a signal representation of the number of clusters which provide ONEs in a signal representation of an unprocessed image.
Figure 8:
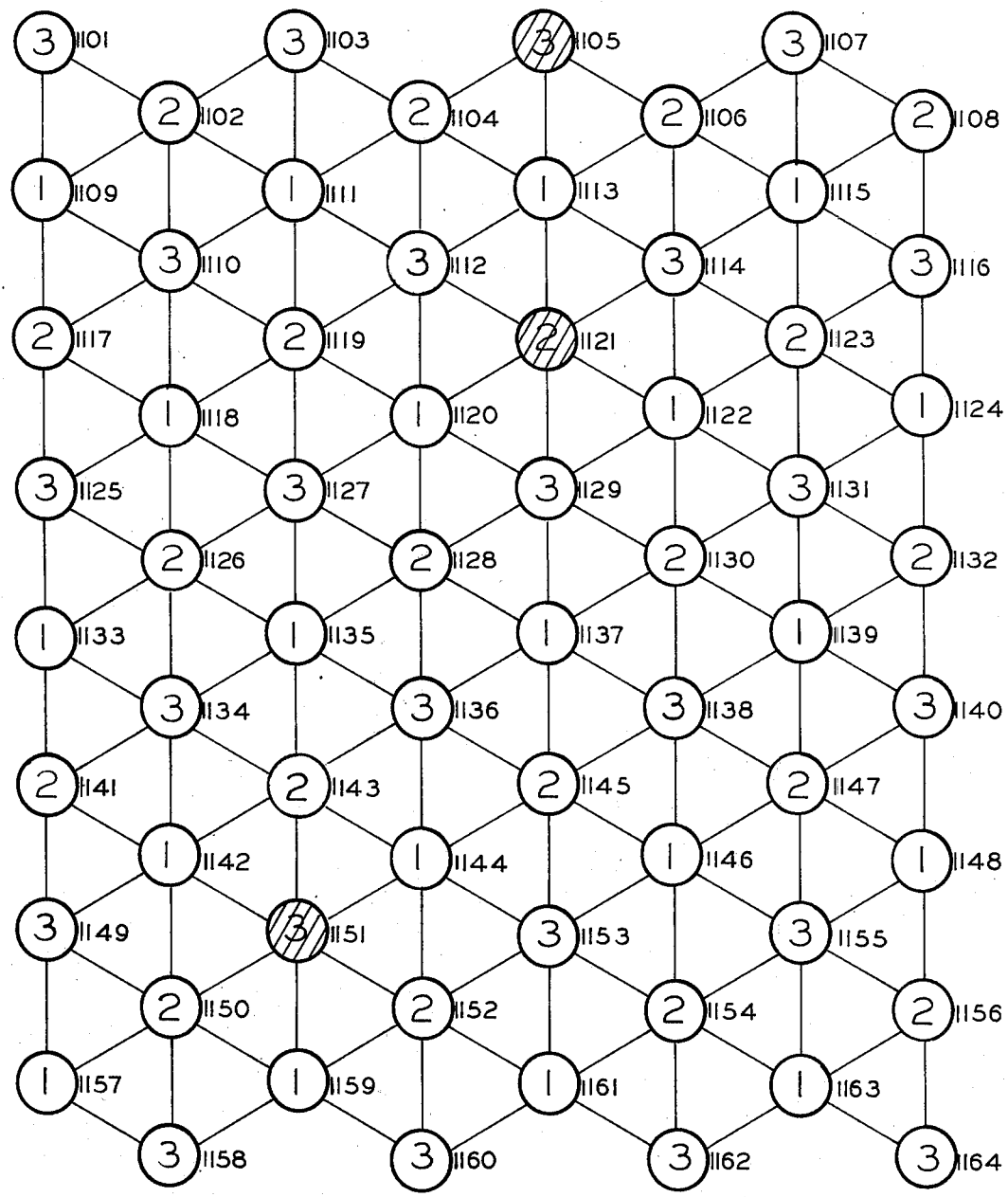
FIG. 8 is a schematic diagram of a signal plane where an output of a bistable device is representative of a clusters which provides ONEs in the signal representation of the unprocessed image of FIG. 2.

A specific example of this operation is given by FIGS. 6–8. Referring now to FIG. 6, the outputs of the bistable devices 1101–1164 (corresponding to elements 10r of FIG. 3) are each assigned a numerical subfield designation of either one, two or three. As noted above, the designations are assigned selectively whereby two bistable devices are not connected when they provide outputs having the same designation. The outputs of the bistable devices having the designations, one, two and three are respectively representative of image elements of a first subfield, a second subfield and a third subfield.

Referring now to FIGS. 7 and 8, the execution of a processing program provides a processed image where clusters 228–230 of FIG. 6 are respectively represented by the outputs of the bistable devices 1151, 1121, 1105 of FIG. 8, the bistable devices which provide 1 (on FIGS. 6 and 8 crosshatching represents a ONE).

It should be understood that when the processing program diagrammed in FIG. 7 is applied to clusters having no zero inclusions such as the clusters illustrated by FIG. 6, the particular process defined by this program will eventually yield isolated 1's which correspond one-to-one, to the original clusters.

This program utilizes the patterns of indexes 1 – 3. It should be understood also that the selection of these patterns in the illustration of this process is not imperative; the patterns 1–4 or 1–5 could have been utilized instead of the patterns 1–3 (as described above) albeit this would affect the location of the resulting single ONE's representative of clusters 228, 229, and 230.

As explained hereinafter, the program provides similar, first second and third subfield comparisons where a first subfield comparison comprises comparing the patterns having the indexes 1–3, to logic signals provided by the surround of a first bistable device having an output which is ONE and has the designation, "1" a correspondence causes a first subfield change whereby the output of the second bistable device changes from 1 to 0.

A second subfield comparison, similar to the first subfield comparison, comprises comparing the patterns having the indexes, 1–3, to logic signals provided by the surround of a second bistable device having an output which is ONE and has the designation, "2" a correspondence causes a second subfield change whereby the output of the second bistable device changes from ONE to Ø.

A third subfield comparison similar to the first and second subfield comparisons, comprises comparing the patterns having the indexes, 1–3, to logic signals provided by the surround of a third bistable device having an output which is ONE and has the designation, "3" a correspondence causes a third subfield change whereby the output of the third bistable device changes from ONE to 0.

According to the processing program, after providing all possible first subfield comparisons and changes, second and third subfield comparisons and changes are successively provided in a similar manner whereby comparisons and changes are carried out in a specified order. Because all of the comparisons are to the patterns having the indexes, 1-3, the first, second and third subfield changes are made to bistable devices included in the outline of a cluster.

The first, second and third subfield comparisons and changes are provided in an iterative manner, each interation causing some of the bistable devices of the clusters 228-230 to provide 0 whenever the initial clusters contained no zero inclusions. The execution of the second processing program is completed when the pattern having the index, 0, corresponds to logic signals provided by the surrounds of the bistable devices which provide ONE whereby the signal representation of the second processed image is provided.

In the execution of the second processing program, a start operation 252 is followed by an operation 254 whereby subfield "1" is first examined. As explained hereinafter, subfield numbers one, two and three are successively examined, i.e. S = 1, 2, 3 in order.

The operation 254 is followed by an operation 255 whereby the logic signal provided by the bistable device 1101 is examined. As explained hereinafter, the logic signals provided by the bistable devices 1101-1164 are successively examined whereby N is successively representative of the bistable devices 1101-1164.

The operation 255 is followed by a decision operation 256. The operation 256 causes a comparison operation 257 in response to the location, N, being representative of a bistable device having an output which is ONE with the designation thereof corresponding to the stored subfield number.

The operation 256 causes a test operation 258 in response to the location, N, being representative of a bistable device having an output which either is 0 or has a designation not corresponding to the stored subfield number.

In the operation 257, the patterns having the indexes, 1-3 are compared to logic signals provided by the surround of a bistable device represented by the location, N. The operation 257 may be comprised of comparisons of the type described in connection with FIG. 3c. The operation 257 causes a change operation 259 when one of the patterns having the indexes 1-3, corresponds to logic signals provided by the surround of a bistable device represented by the location, N.

The operation 257 causes the operation 258 when none of the patterns having the indexes, 1-3, correspond to logic signals provided by the surround of a bistable device represented by the location, N.

The operation 259 causes a change from 1 to 0 in the logic signal provided by a bistable device represented by the location, N. The operation 259 is followed by the operation 258.

The operation 258 causes an indexing operation 260 when the location, N, is not representative of the bistable device 1164; a decision operation 261 is caused when the location, N, is representative of the bistable device 1164.

The operation 260 causes the location, N, to index to the logic signal stored by a next successive one of the bistable devices 1101-1164 Thereafter, the program interatively performs the operations 255-260 as described hereinbefore.

Because of the iteration of the operations 255-260, when the location, N, is representative of the bistable device 1164, the location, N, has been representative of the bistable devices 1101-1164 while the signal representation of the stored subfield number remained unchanged. Accordingly, when the location, N, is representative of the bistable device 1164 and the program performs the operation 258, subfield comparisons and changes were provided for bistable devices having outputs with a designation corresponding to the unchanged stored subfield number.

The operation 261 causes an indexing operation 262 when S does not provide a signal representative of the subfield number, three; a test operation 263 is caused when S represent the subfield number, three.

The operation 262 causes S to advance to the next successive subfield number. Thereinafter, the computer iteratively performs the operations 255-262.

Because of the iteration of the operations 255-262, S is set to subfield number, three, and the computer performs the operation 261, the subfield comparisons and changes have been provided in the specified order for the bistable devices 1101-1164.

The operation 263 causes a stop operation 264 when the bistable devices 1101-1164 which provide 1 have surrounds which provide logic signals corresponding to the pattern having the index, 0. The operation 263 causes an iteration of the operations 254-263 when one (or more) of the bistable devices 1101-1164 provides 1 and does not have a surround which provides logic signals corresponding to the pattern having the index 0.

When the operation 264 is performed, (which can occur only when the original clusters had no zero inclusions) the bistable devices 1101-1164 of FIG. 8 provide the signal representation of the processed image.

Swelling is defined by the notation $M_{3 \cdot 5}{}^3[k = a_{i(k)} + a_{\bar{i}(k)}.k]$. Thus, any subelement $k$ in the $k$ layer and in the subfield grouping operated on for which $a_{i(k)}$ equals 1, is placed in state 1; otherwise it is left unchanged. This causes all blobs in layer $k$ to smooth their outsides until they are convex everywhere, or until the proximity of another blob prevents any further swelling, while any simple hole in a blob shrinks to a single 0.

A simple program for counting blobs having only simple holes in a group of blobs would consist in applying first the notation $M_{3 \cdot 6}{}^3[k = a_{i(k)} + a_{\bar{i}(k)}.k]$ to fill all the holes in any hollow blob and swell the outer parts of the blobs until they are convex, except where the nearness of another blob prevents further swelling. Next the notation $M_{1 \cdot 5}{}^3[\overline{k = a_{\bar{i}(k)}}.k]$ is applied to shrink every blob to a single 1 after which the 1's are counted by counting instruction which causes all the outputs $k, \bar{k}$ of all the $k$ subelements to be fed to the evaluation unit 4 (FIGS. 1 and 3).

It should be noted that the elements 13 at the edge of the field remain in a fixed state, normally 0, and are never operated on themselves.

Figure 4:
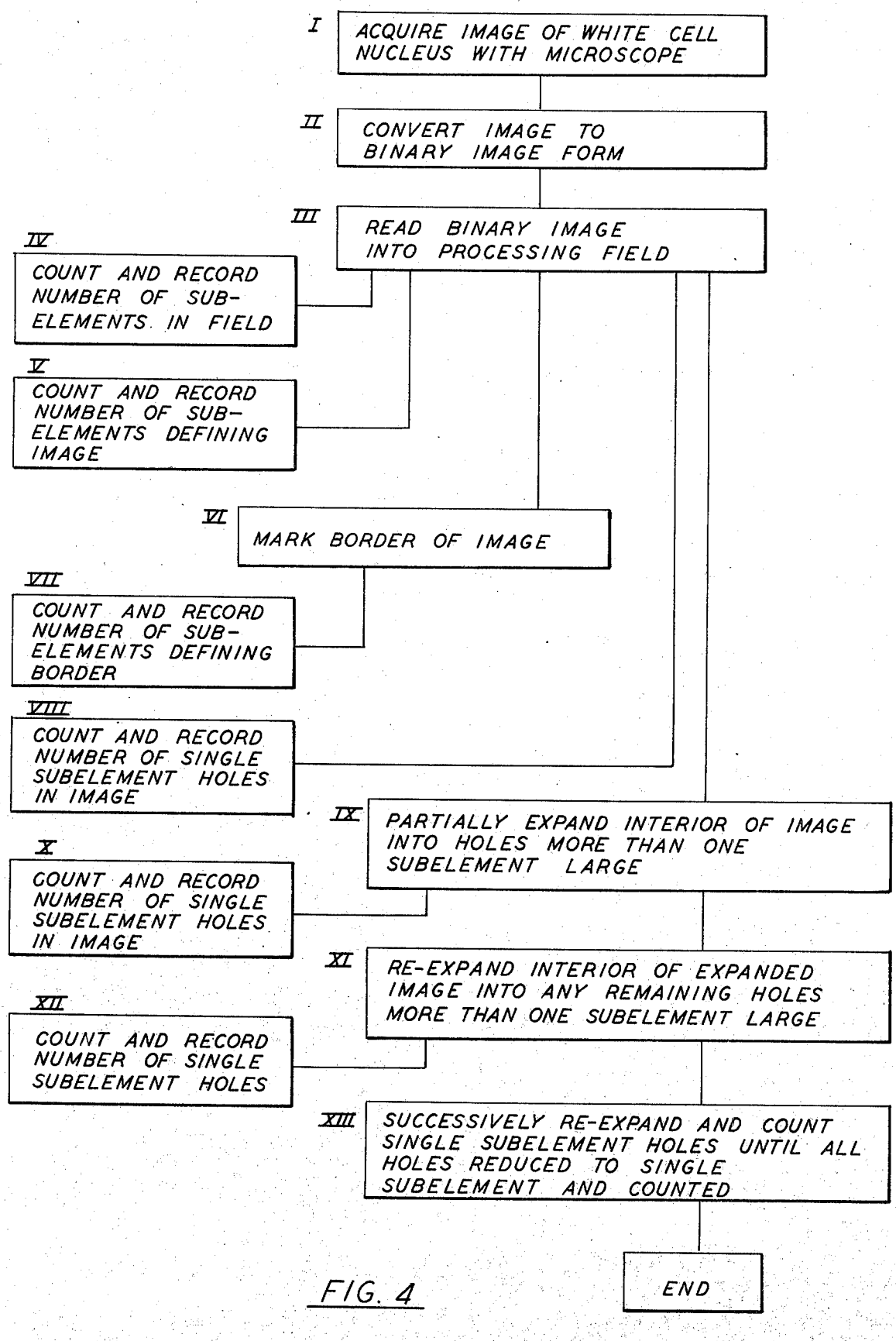
FIG. 4 is a flow chart of a program adapted to be carried out by the method and the processing system of this invention, being a program for measuring certain critical features of a white blood cell nucleus for the purpose of typing the cell.

A specific example of the manner in which the processing field and data processing method of this invention are adapted to be used is illustrated by the following detailed description of a program for identifying the type of a white blood cell by measuring certain significant features of its nucleus that serve to identify it by comparing the measurements taken with like measurements of the nuclei of previously identified types of white blood cells. FIG. 4 is a flow chart for the program; FIGS. 4a – 4f illustrate displays of the processing field of subelements at various stages in the carrying out of the program.

The specific program illustrated is only representative of the complete series of operations which might be required to identify a given cell. It has been determined that identification can be made with 90% accuracy, by reproducing images of appropriately stained nuclei taken at two different wavelengths in the field and performing a series of procedures of the type illustrated in the following discussion. The fact that automated analyses of large numbers of blood smears and of the 50 to 100 photographs which may be taken of each smear may be performed is in contrast with the fact that the accuracy of a technician performing the same processing may only be on the order of 60 to 70%.

The processing operations for carrying out the program of FIG. 4, and the particular instructions therefore, are described in the following paragraphs which are headed and numbered in correspondence with the general program steps illustrated in FIG. 4.

I. Acquire image of white cell nucleus with microscope.

A blood smear is stained and photographed at a particular wavelength for the particular features of interest of the nucleus to show up.

II. Convert image to binary image form.

Sequential spots of the image and surrounding areas are reproduced as 0 or 1 if they are lighter or darker than a predetermined threshold degree of lightness or darkness.

III. Read the binary image into processing field.

Figure 4A:
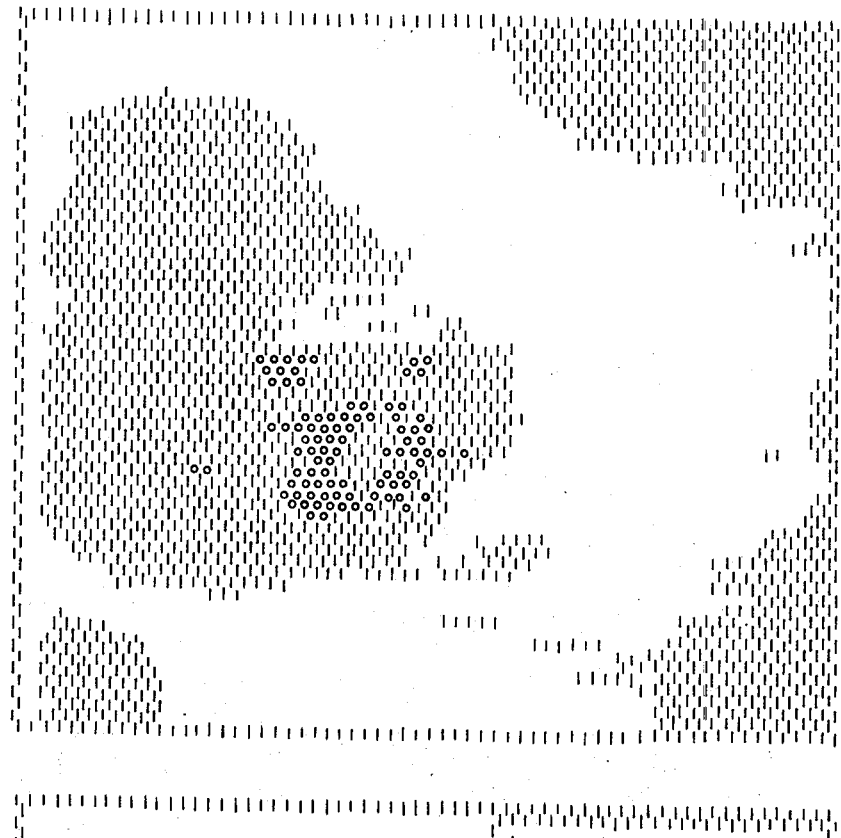
FIGS. 4a – 4f are illustrations of a display of the field of this invention at various stages in the carrying out of the program illustrated in FIG. 4.

By means of the input data reader 1 the subelements 10 in the field of subelements of a selected layer 11, layer 11r for purposes of illustration, are placed in a 0 or 1 state to conform to the 0 or 1 state of the corresponding spots of the binary image field. This produces a pattern of 1's and 0's such as shown in FIG. 4a, the 1's corresponding to the dark regions of a stained white blood cell nucleus taken at a selected wavelength. The void area of the photograph, which informationally contains 0's, corresponds to either a void or the cytoplasm of the blood cell. The three regions of 1's touching the borders of the field represent either adjacent nuclei or red blood cells. The large region of 1's at the left is the nucleus of a white blood cell. Holes within the nucleus are marked in 0's. For clarity of illustration, the 0's of the surrounding void have not been marked. FIG. 4a shows several isolated clusters of 1's which, when the wavelength and staining chemical are known, provide additional information concerning the blood cell type. For purposes of illustration, these smaller regions will not be utilized.

The following general program steps IV – XIII are translated into specific instructions described below and these instructions are then coded in sequence in a form, such as tape, to be placed in the program unit 3 (FIG. 1) and cause the program unit to actuate the instruction bank 5 to issue specific command signals to the subelements of the field or to the evaluation unit 4 to carry out the program instruction.

IV. Count and record number of subelements in field.

Normally the number of elements in the field are known so that no special count is necessary, it only being necessary to record the number of elements in the field in the output unit 9 to be available from the output unit.

V. Count and record number of subelements defining image.

This is accomplished by a coded program command in response to which the program unit 3 issues an instruction to the instruction bank 5 to send a signal to the evaluation unit that will cause the evaluation unit to count all the binary 1's in the field layer 11r and send the count to output.

As a result of steps IV and V the output unit 9 will have a count of the field size and of the size of the portion of the field occupied by the image area. The ratio of these two counts, which may suitably be computed automatically by an appropriately programmed computer concerned to receive data from the output unit 9, will provide an approximate measure of the size of the nucleus material in the field, which is one of a number of measurements utilized to type the nucleus. In practice the image acquired by the microscope and inserted into the field as a binary image would be selected to include a single nucleus or a known number of nuclei so that the foregoing measurement would be more accurate than the measurement of parts of the image area shown in FIG. 4a which includes material in addition to a whole nucleus.

It is also of significance to determine the length of the border of the nucleus, as called for by the next two program steps VI and VII, since this information, combined with the measurement of its area, as determined by steps IV and V above is of use in identifying the category of shape of the nucleus and, thus, the type of cell.

VI. Mark the border of the image.

This is accomplished by a program instruction which changes all data points (i.e. subelements in the field layer containing the binary image) which are in the center of a plurality of 1's to 0's while retaining those required for border continuity. This is suitably performed by retaining the layer r in its original state and reproducing the image border only in a previously empty layer, layer s in this case. Instructions to be placed in the program unit for causing the instruction bank to issue appropriate command signals to the field subelements for carrying out this step are prepared by a programmer from the universal notation previously described, which indicates the command information to be supplied for the subelement logic circuits to carry out the desired processing operation with the method and apparatus of this invention. The notation for the specific instructions for carrying out this program step VI is as follows:

$$M_{1\text{-}5}[s_{n+1} = d_s \cdot a_{(L_1)} \cdot r_n]$$

Figure 4B:
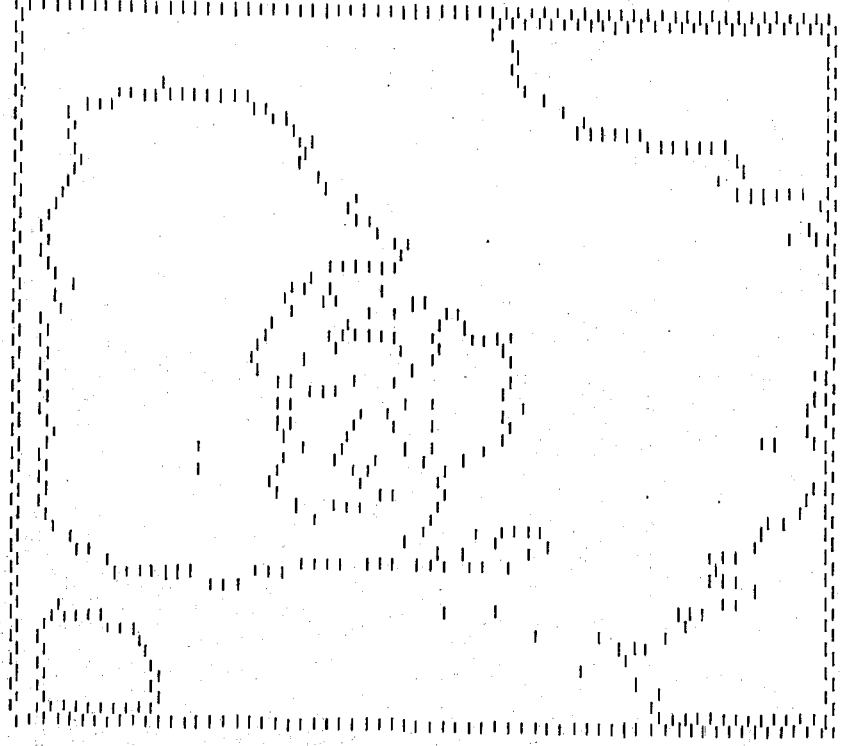

This operation reproduces in layer s all the subelements of layer r of value 1 in whose neighborhood of six surrounding subelements all the 0 states and all the 1 states are adjacent, (i.e., those whose six neighbor indexes are 1–5) and does not reproduce in layer s the subelements of layer r which are in the 1 state and whose six neighbor subelements are all either in the 0 or 1 state. This is indicated by the subscript 1–5 of the M term. Note that since this is simply a marking operation in previously empty layer s, no $S_M$ term (indicating the original state of the 10s subelement) is required, and is omitted, since it is 0 for all subelements in layer s, and no sequential subfield operation is necessary so that no $L_2$ term (and superscript of M term) is required. Also there is no $L_3$ term (for the new state of each subelement 10s meeting the selecting conditions) since $L_3$ equals $r_n$. Thus, in words this notation means simply that each subelement of the s layer ($s_{n+1}$) is placed in the 1 state where the corresponding subelement of the r layer ($r_n$) has a neighborhood surround of index 1, 2, 3, 4 or 5. The specific instructions embodied in this notation are for the instruction bank to successively apply the index patterns 1–5 from surround shift register 142 in the instruction bank to the modulo 2 adders 141 in each subelement via subelement input "i" (FIG. 3d), to be compared with the states of the neighbor subelements applicable to the modulo 2 adders from the subelement inputs $L_1$. The $d_s$ term as an instruction causes a ONE signal to be fed to the $d$ inputs of each subelement in the $s$ layer so that the logical operations indicated by other command signals to the subelements will only be actuated in the $s$ layer subelements. The $a_i(L_1)$ term, as previously described, represents a function generated internally in the subelements in the operation of the logic circuit in a subelement in the $r$ layer, when the pattern of states ($L_1$) of the six neighbors matches any one of the designated index patterns 1–5, in any rotational position thereof, a 1 appearing at the $a_i(L_1)$ output of the circuit portion illustrated in FIG. 3c goes to the $a_i(L_1)$ input of the circuit portion shown in FIG. 3a of the subelement in this $r$ and to the corresponding $a_i(L_1)$ input of the corresponding subelements in the other layers. When this ONE signal appears at the $a_i(L_1)$ input of the corresponding subelement in the $s$ layer, it, and the 1 command signal from the instruction bank to its $d_s$ input, co-operate in the $s$ subelement circuit portion corresponding to the circuit portion shown and described with reference to FIG. 3a, to place this subelement in the $s$ layer in binary state 1. FIG. 4b shows the states of the field of subelements in layer $s$ wherein the border of the image is marked in binary 1's after application of the instructions called for by the foregoing notation. The count of the binary 1's in layer $s$ is then made by a count instruction from the instruction bank to the evaluation unit which makes the count and sends it to output unit 9, after which a program instruction from the program unit causes the instruction bank to issue a command signal emptying layer $s$ by placing all the $s$ layer subelements in binary 0 state.

Figure 9:
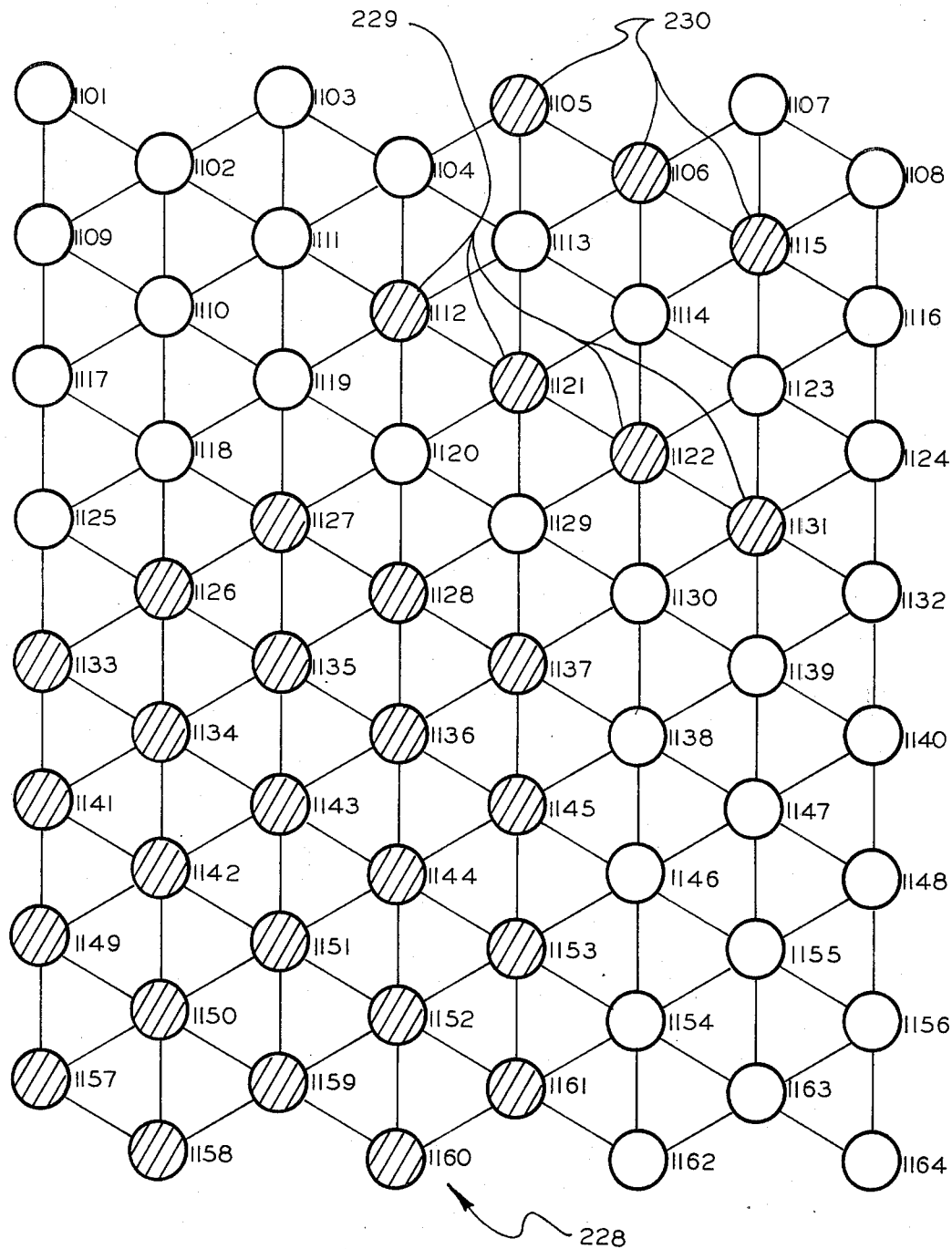
FIG. 9 is a schematic diagram of a signal plane which provides a signal representation of an unprocessed image.
Figure 10:
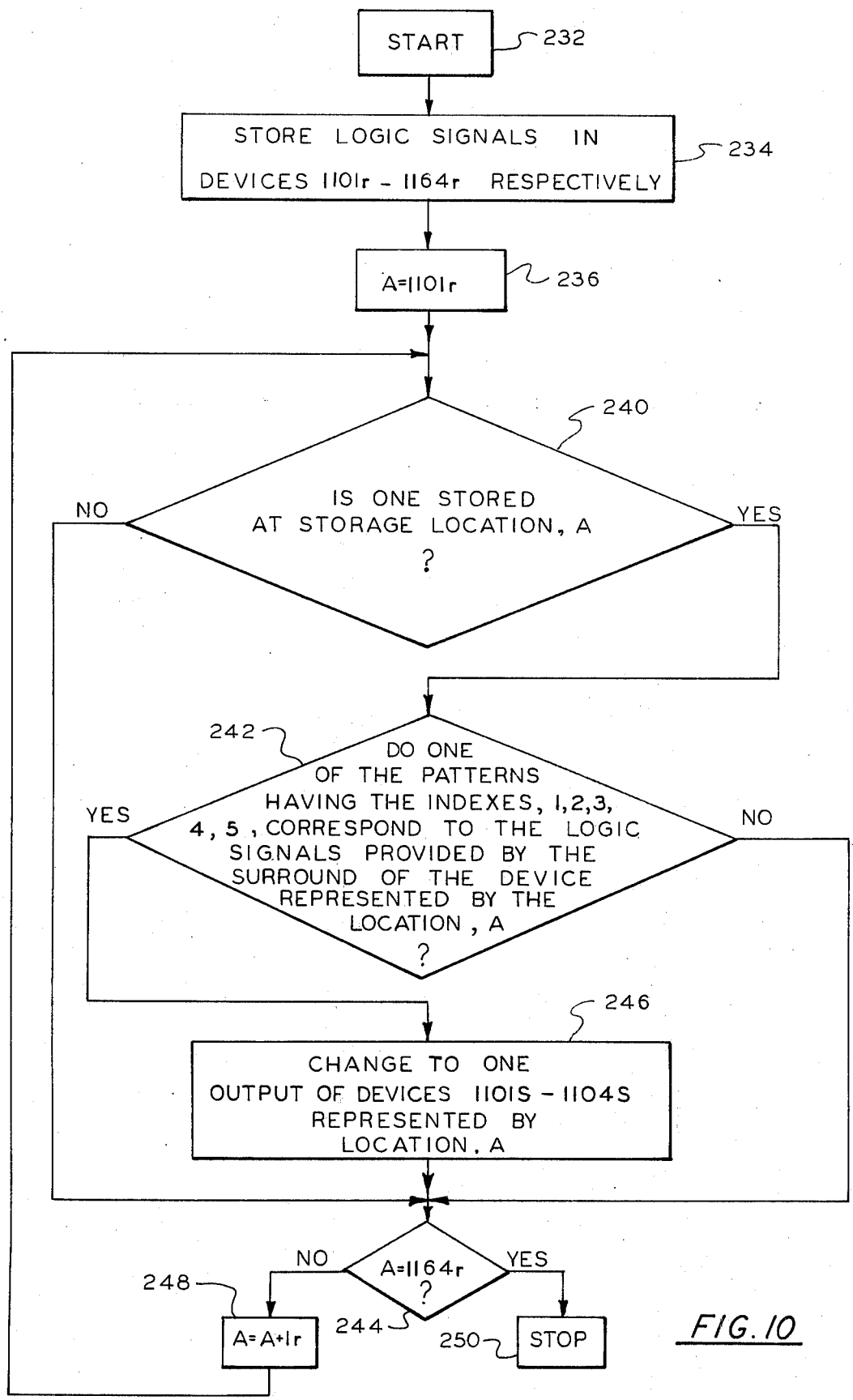
FIG. 10 is a logic flow diagram of a computer program for providing a signal representation of outlines of clusters which provide ONEs in a signal representation of an unprocessed image.
Figure 11:
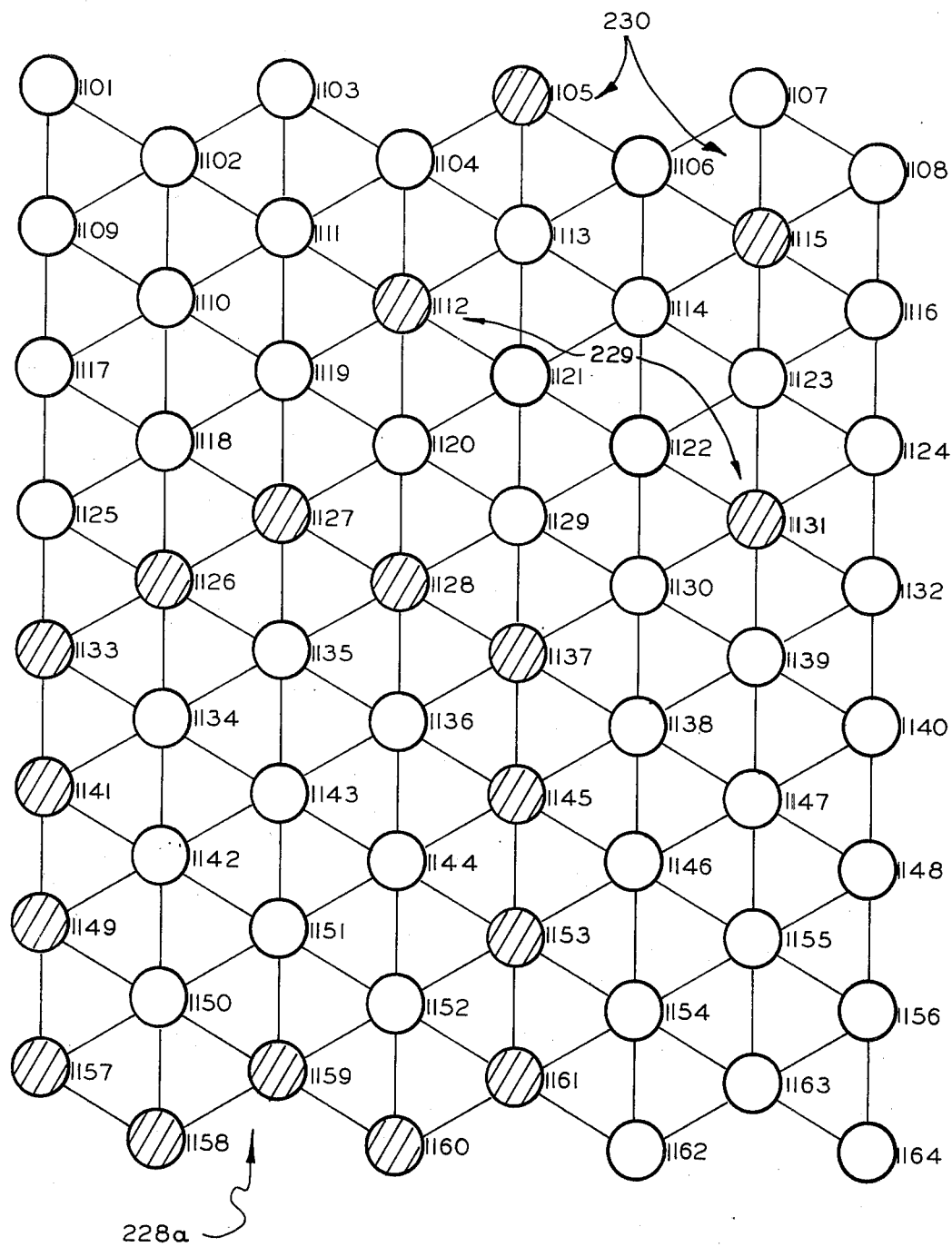
FIG. 11 is a schematic diagram of a signal plane which provides a signal representation of the outlines of the clusters which provide ONEs in the signal representation of the unprocessed image of FIG. 2.

Such an operation illustrated by FIGS. 9, 10 and 11. Referring to FIG. 9, those of the bistable devices 1101r–1164r (corresponding to devices 10 of FIGS. 2, 2a, b and c and 3) which provide ONE are indicated with cross-hatching; they have outputs representative of connected image elements and are referred to as forming a cluster. FIG. 6 represents the state of the elements in layer $r$. Accordingly, 1's of a signal representation of an unprocessed image are provided by clusters 228–230.

Referring to FIG. 11, there is shown a signal representation of a processed image of outlines of the clusters 228–230 of FIG. 6 contained in layer $s$ as extant after the execution of a processing program. The 1's of the processed image are provided by bistable devices 1101s–1164s included in an outline cluster 228a and the clusters 229, 230, it being understood that the clusters 229, 230 are of a type where the signal representations of the outlines of the clusters 229, 230 are respectively provided by the clusters 229, 230.

The processing program is predicated upon inherent characteristics of the patterns having indexes, 1, 2, 3, 4, 5. A bistable device which is included in a cluster, but not included in the outline thereof, has a surround which provides logic signals corresponding to the pattern having the index, 6; a bistable device, which is not included in a cluster and is not neighbor to any 1, has a surround which provides logic signals corresponding to the pattern having the index, 0. Accordingly, the first processing program includes comparing the patterns having indexes, 1, 2, 3, 4, 5, i.e., $\overline{0,6}$ to logic signals provided by surrounds in the signal representation of the unprocessed image. As explained hereinafter, in response to any of the patterns having indexes, 1, 2, 3, 4, 5 corresponding to logic signals provided by a surround of a given bistable device in layer $r$ which provides 1, the program causes the corresponding bistable device in layer $s$ to provide 1 whereby a first processed image is provided.

The execution of the first processing program (FIG. 10) is initiated by a start operation 232 which is followed by a first set up operation 234, whereby the logic signals are stored by the bistable devices 1101r–1164r.

In a second set up operation 236 a location, A, is determined. As explained hereinafter, A, is successively representative of the devices 1101r–1164.

The operation 236 is followed by a decision operation 240 which causes either a decision operation 242 or a test operation 244 in response to the location, A, storing 1 and 0, respectively.

In the operation 242, the patterns having the indexes, 1, 2, 3, 4, 5 are compared to logic signals provided by the surround of a bistable element representd by the location, A. The operation 242 may be comprised of comparisons of the type described in connection with FIG. 3c. The operation 244 is explained hereinafter.

The operation 242 causes a change operation 246 when any of the patterns having the indexes, 1, 2, 3, 4, 5, corresponds to the logic signals provided by the surround of a memory device represented by the location, A; the operation 244 is caused when none of the patterns having the indexes, 1, 2, 3, 4, 5, correspond.

The operation 246 causes a setting to 1 of the logic signal provided by a bistable device in layer $s$ associated with the device represented by the location, A in layer $r$. The operation 246 is followed by the operation 244 referred to hereinbefore.

The operation 244 causes an index operation 248 when the location, A, is not representative of the device 1164r. A stop operation 250 is caused when the location, A, is representative of the device 1164r.

The operation 248 causes the location, A, to index to the next successive one of the devices 1101r–1164r. Thereafter, the program iteratively performs the operations 240, 242, 244, 246, 248, as described hereinbefore. Because of the iteration, when the location, A, is representative of the device 164r, the location A has been representative of the devices 1101r–1164r. When the program performs the operation 250, the bistable devices 1101s–1164s provide the signal representation of the processed image (FIG. 11).

Although the processing program is described hereinbefore as operations which are perfomed in a serial manner, it should be understood that in an alternative embodiment corresponding operations may be provided simultaneously (in a parallel manner).

Another significant item of information in identifying blood cells is to find the number and relative size of inclusions, that is, of holes in the nucleus which are completely enclosed by nuclear material. While a human observer can readily measure the number and relative size of these inclusions, the machine must count by applying successive instructions which expand the positive data point region into the zero regions while preserving those inclusions which have already been reduced to a single point and, after applying each such instruction, counting only those inclusions which have been reduced to a single zero. The mechanical processing operations adapted to be carried out by the method and apparatus of this invention are described in the following sequence of program steps VIII to XIII.

VIII. Count and record number of single subelement holes in image.

This is accomplished by applying instructions to locate all holes in the image in the r layer, i.e., subelements 10r in the 0 state, surrounded by six subelements 10r all in the 1 state, (neighborhood pattern of index 6) and segregating them for counting by reproducing them as 1's in a previously empty layer, such as layer s. The notation for this segregation operation is:

$$M_6[s_{n+1} = d_s \cdot a_{i(L_1)} \cdot \bar{r}_n]$$

In words this indicates that for all subelements in layer r that are in the 0 state ($\bar{r}_n$) and that have the neighbor pattern index 6 ($M_6$), the corresponding subelement in the s layer (designated by $d_s$) is placed in the 1 state (indicated by $s_{n+1}$) since this is a simple marking operation, subfields, that would be indicated by a superscript of M and an $L_2$ term need not be used. As seen in FIG. 4a there are only two such 0 inclusions in the image in layer r. When these are reproduced as 1's in layer s (not shown) a programmed count instruction actuates the instruction bank to command the evaluation unit to count the 1's (two) in layer s and send the count to output unit 9.

IX. Partially expand interior of image into holes more than one subelement large.

After the count is made in steps VIII the holes in the layer r images (0's) which are more than one subelement large must be reduced to one subelement size in order to be counted utilizing the segregation notation explained under step VIII. For this purpose an expansion operation is applied to convert all subelements in layer r having neighborhood indices 3-5 to the 1 state while leaving all other elements in their original state. The notation for this operation is:

$$M_{3\text{-}5,2}{}^3[r_{n+1} = d_r \cdot a_{i(L_1)} \cdot L_2 \cdot 1 + \overline{d_r \cdot a_{i(L_1)} \cdot L_2} \cdot r_n]$$

Figure 4C:
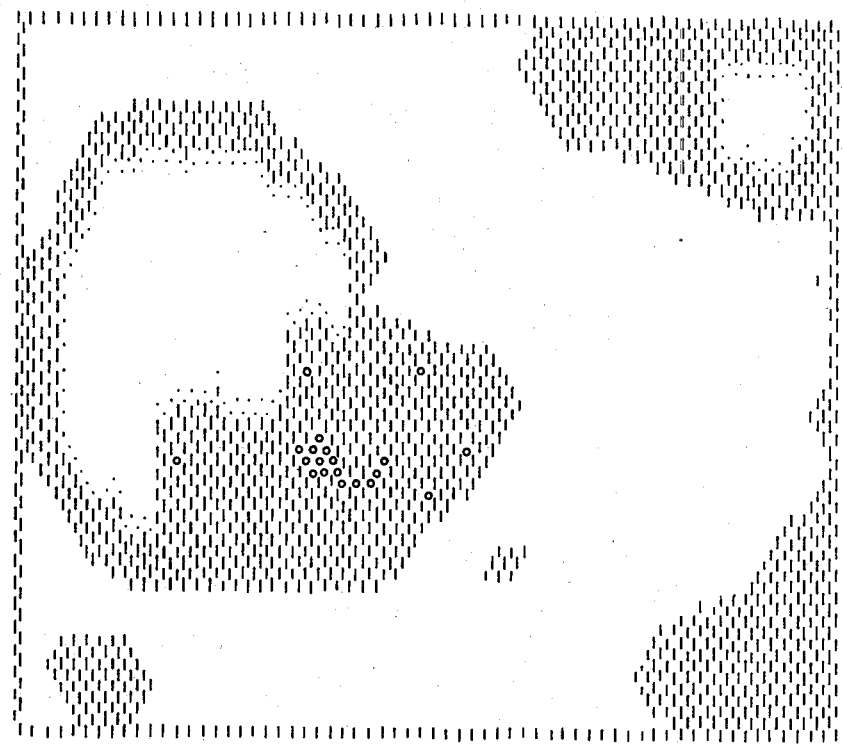
Figure 4D:
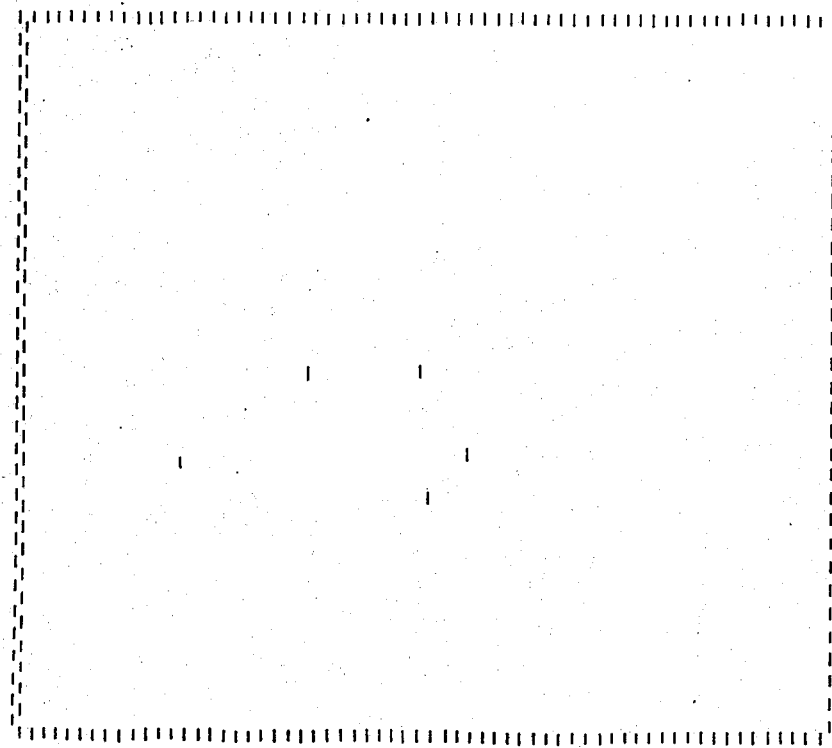

In words this indicates that all subelements in layer r, regardless of their original state (indicated by $1+d_r \cdot a_{i(L_1)} \cdot L_2 \cdot r_n$ in which the $d_r$ and $L_2$ indicator terms are ignored) that have neighborhood pattern indices 3, 4 or 5 are placed in the 1 state. The superscript 3 and the presence of the $L_2$ term indicate that subfields of three are used, the instruction for the indicated operation being performed separately on each of the three subfields in sequence. The second subscript, 2, of the M term indicates that the operation is applied two times. The $d_r$ term, of course, indicates that the operation is to be performed in the r layer, for which purpose a 1 signal will be sent from the instruction bank to the d input of all subelements in the r layer. The transformed appearance of layer r resulting from this operation is illustrated in FIG. 4c.

X. Count and record number of single subelement holes in image.

This calls for an application of segregating and counting instructions as described with reference to step VIII to the layer r as transformed by step IX. As seen in FIG. 4c there are five single element holes in the image pattern; these are segregated by marking them as 1's in layer s to produce the layer s pattern shown in FIG. 4d. The five 1's in layer s are then counted in response to a count command to the evaluation unit and the count transferred to the output unit as in step VIII.

Figure 4E:
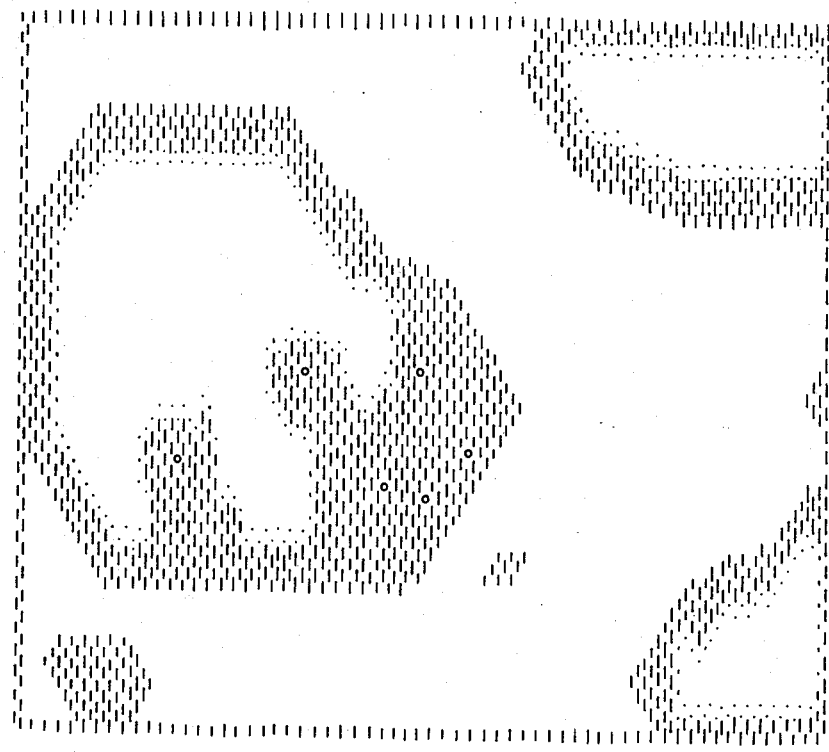
Figure 4F:
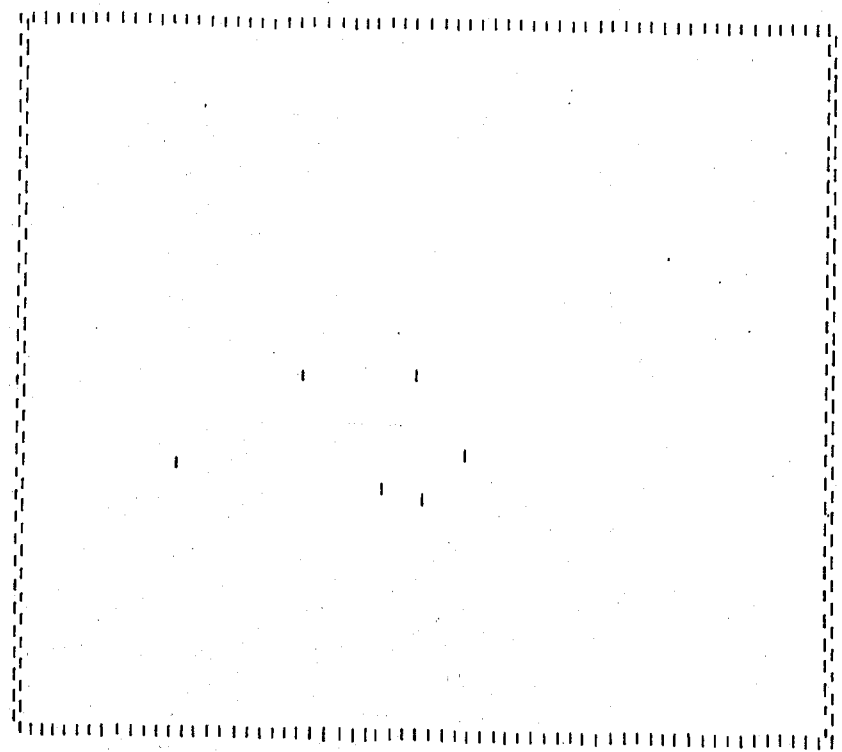

As indicated by steps XI, XII and XIII the operation of partial expansion described in step IX and the operation of counting of single element holes described in step VIII are repeated on the next previously expanded pattern until all multiple element holes are reduced to single element holes and counted. FIG. 4e shows the result, i.e., six single element holes, of further partially expanding the layer r pattern shown in FIG. 4c. FIG. 4f shows the transformation of the single element holes of FIG. 4e into 1's in layer s for counting. By recording the count after each expanding operation, an inclusion histogram for the cell in question is obtained which is of the following type: 2 (from step 4) . . . 5 (from step 6) . . . 6 (from step 8).

The exact pattern obtained from a given cell thus reveals the number and relative size of the inclusions and is extremely useful in identifying the cell type.

The procedures described are illustrative of those used to identify the various types of white blood cells. A total of 32 such measurements, 16 at each of two different wavelengths, are sufficient to identify the cell. In general, fewer measurements can be made to produce satisfactory results by making one or two of the measurements, selecting the most likely cell type on the basis of the results of these measurements and performing several more measurements which will then indicate whether or not the cell is of the selected type, thereby substantially reducing the total number of measurements required for identifying a large number of cells.

FIGS. 12-17 illustrate the application of the present invention to a representation of the lobes of nuclei of neutrophils of a photomontage of nuclei of neutrophils and nuclei of lymphocytes. Additionally, a description is provided of a method for providing respective signal representations of the nuclei of the neutrophils and the nuclei of the lymphocytes of the photomontage.

Figure 12:
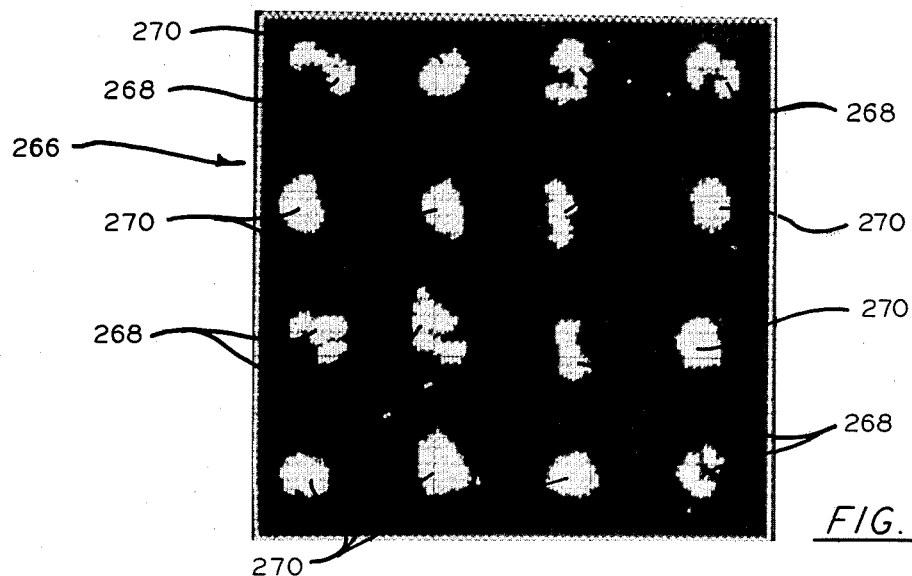
FIG. 12 is a photograph of a cathode ray tube display representative of a signal plane which provides a signal representation of a photomontage of nuclei of lymphocytes and neutrophils.

Referring now to FIG. 12, the outputs of a layer 11 (see FIG. 2) of subelements 13 comprise a signal plane 266 which provides a signal representation of a photomontage of neutrophil cell nuclei 268 and lymphocyte cell nuclei 270.

In utilizing the present invention to process the signal representation of the photomontage, a layer of subelements, i.e., bistable devices, are loaded to store the logic signals respectively provided by the input data reader. Accordingly, the signal representation of the photomontage is stored within the apparatus where a layer of bistable devices are respectively associated with the input image.

In a first processing step, the program compares the logic signals provided by surrounds of the signal plane bistable devices which provide 1 to the pattern having the index, 6; in the absence of a correspondence of the logic signals provided by a surround, the output of a central bistable device thereof is changed from 1 to 0, i.e., only those devices surrounded by the pattern having an index 6 remain a 1.

Figure 13:
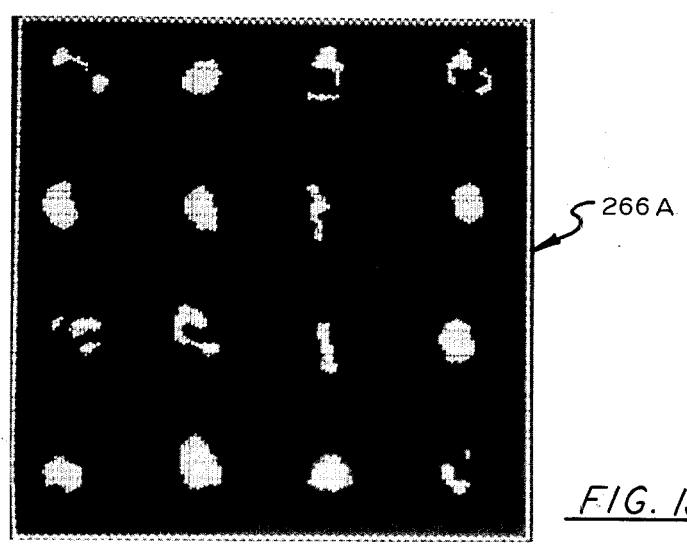
FIG. 13 is a photograph of a cathode ray tube display representative of a signal plane which provides a signal representation of a processed image drived from the signal representation of FIG. 13.

Referring now to FIG. 13, a completion of the first processing step, which is a shrinking operation similar to that described above in conjunction with FIGS. 6-8, causes a provision of a signal representation of a first modified image whereby the outputs of the layer of bistable devices comprises a signal plane 266A.

The first processing step is followed by a second processing step where a first of three portions thereof is an assignment of the subfield designations, one, two and three (as described in connection with FIG. 12a-c) to the outputs of the multiplicity of bistable devices of the plane 266A.

A second portion of the second processing step is a comparison of the logic signals provided by the surrounds of the signal plane bistable devices having outputs which are 1 and have the designation, one, to the patterns having the indexes, 1–4; in response to a correspondence of the logic signals provided by a surround, the output of a central signal plane bistable device thereof is changed from 1 to 0 by the computer.

In a third portion of the second processing step the logic signals provided by the surrounds of the signal plane bistable devices having outputs which are 1 and have the designations, two and three, are successively compared with the patterns having the indexes, 1–4; a correspondence causes a change from 1 to 0 in the output of a central bistable device of the signal plane as described hereinbefore.

Figure 14:
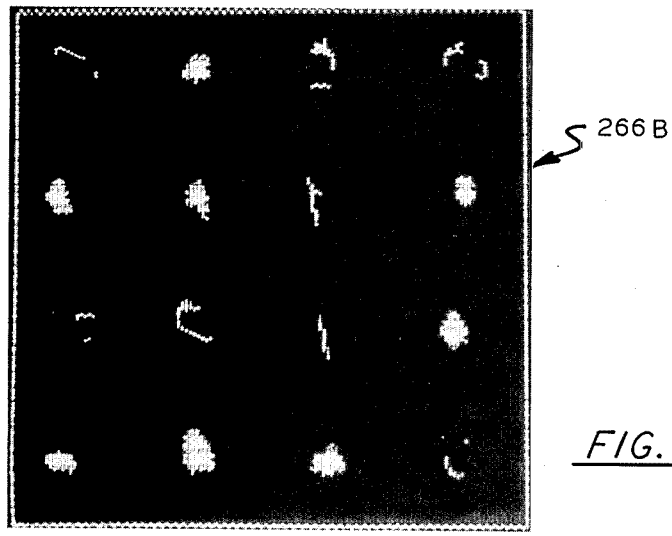
FIG. 14 is a photograph of a cathode ray tube display representative of a signal plane which provides a signal representation of a processed image drived from the signal representation of FIG. 13.

Referring now to FIG. 14, a completion of the second processing step, which is also a shrinking operation, causes a provision of a signal representation of a second modified image whereby the outputs of the multiplicity of bistable devices comprises a signal plane 266B.

The second processing step is followed by a third processing step which is iteratively performed four times.

According to a first of three portions of the third processing step, the program compares the logic signals provided by the surrounds of the signal plane bistable devices having outputs which are 1 and have the designation, two, to the patterns having the indexes, 1, 2; in response to a correspondence of the logic signals provided by a surround, the output of a central bistable device thereof is changed from 1 to 0 by the program.

According to a second portion of the third processing step the program compares the logic signals provided by the surrounds of the signal plane bistable devices having outputs which are 1 and have the designation, one, to the patterns having the indexes, 1, 2; in response to a correspondence of the logic signals provided by a surround, the output of a central bistable device thereof is changed from 1 to 0 by the program.

According to a third portion of the third processing step the program compares the logic signals provided by the surrounds of the signal plane bistable devices having outputs which are 1 and have the designation, three, to the patterns having the indexes, 1, 2; in response to a correspondence of the logic signals provided by a surround, the output of a central bistable device thereof is changed from 1 to 0.

Figure 15:
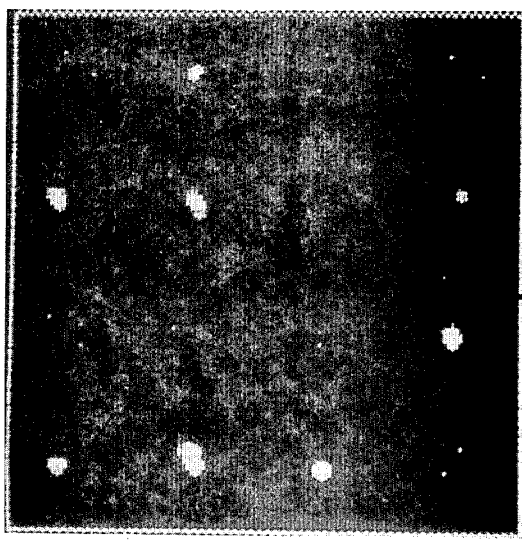
FIG. 15 is a photograph of a cathode ray tube display representative of a signal plane which provides a signal representation of the number of lobes of the nuclei of the neutrophils of FIG. 12.

Referring now to FIG. 15, performing the third processing step four times causes the provision of a signal representation of a third modified image whereby the outputs of the multiplicity of bistable devices comprise a signal plane 266C.

In the plane 266C, the lobes of the neutrophils of the photomontage are respectively represented by the outputs of the central bistable devices which provide 1 and have surrounds which provide logic signals corresponding to the pattern having the index, 0, (represented by white dots in FIG. 15).

Thus there has been described a method for providing a signal representation of lobes of the nuclei of the neutrophils of the photomontage, i.e., these isolated devices may simply be counted and obtain a lobe count.

A fourth processing step causes the provision of signal representation of the lymphocytes of the photomontage.

In the fourth processing step, the program compares the logic signals provided by the surrounds of the signal plane bistable devices which provide 1 to the patterns having the indexes, 1–13, in the absence of a correspondence of the logic signals provided by a surround, the output of a central bistable device thereof is changed from 1 to 0.

The fourth processing step is followed by a fifth processing step which is iteratively performed eight times. This step requires the storage in another layer of the original signal plane 266. If these latter steps are to be performed, an initial duplication will be carried out, e.g. signal plane 266 can be stored in both layers and layer $r$. It will be presumed that layer $r$ has been used to this point and plane 266C is now stored in layer $r$ with plane 266 in layer $s$. In the fifth processing step, when a particular bistable device in layer $s$ provides 1, its surround of bistable devices in layer $s$ is compared with the patterns having the indexes, 0, 5–13. Concurrently with the comparison of the logic signals provided by the surround of an associated device in layer $s$, logic signals provided by the surround of a corresponding bistable device in layer $r$ are compared to the patterns having the indexes, 1–4. In response to either the logic signals provided by the surrounds of the associated device layer $s$ or the particular bistable device in layer $r$ corresponding to the patterns having the indexes, 0, 5–13, and the indexes, 1–4, respectively, the output of the particular bistable device in layer $r$ is set to a 1. The fifth processing step is completed when the logic signals provided by the surrounds of all of the signal plane bistable devices of layers $r$ and $s$ which provide 1 and the logic signals provided by the surrounds of respectively associated devices of layer $s$ and $r$ are compared and outputs of the signal plane bistable devices of layer $r$ changed as described hereinbefore.

Figure 16:
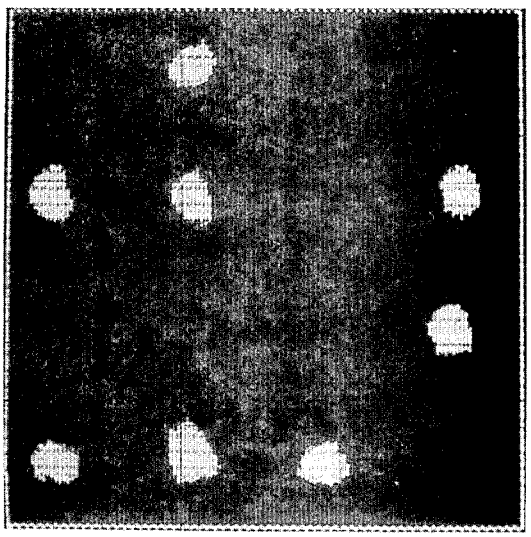
FIG. 16 is a photograph of a cathode ray tube display representative of a signal plane which provides a signal representation of the nuclei of the lymphocytes of FIG. 12.

Referring now to FIG. 16, performing the fifth processing step eight times causes the provision of a signal representation of a fifth modified image. According to the present invention, the fifth modified image is of the nuclei of the lymphocytes of the photomontage.

When a signal representation of the neutrophils of the photomontage is desired, the third processing step is followed by an alternative fourth processing step and the eight iterations of the fifth processing step described hereinbefore.

In the alternative fourth processing step the program compares the logic signals provided by the surrounds of the signal plane bistable devices which provide 1 to the pattern having the index, 0; in the absence of a correspondence of a surround, the output of a central bistable device thereof is changed from 1 to 0.

Figure 17:
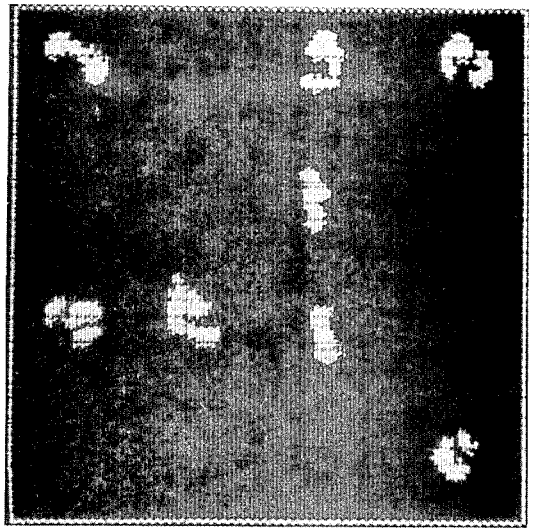
FIG. 17 is a photograph of a cathode ray tube display representative of a signal plane which provides a signal representation of the nuclei of the neutrophils of FIG. 12.

Referring now to FIG. 17, when the alternative fourth processing step is followed by the eight iterations of the fifth processing step, the signal plane bistable devices provide a signal representation of a sixth modified image. According to the present invention, the sixth modified image is of the nuclei of the neutrophils of the photomontage.

Thus there has been described a method for providing respective signal representations of the neuclei of lymphocytes, nuclei of neutrophils and lobes of the nuclei of neutrophils included in an exemplary image.

Another example of the application of two-dimensional data processing adapted to be performed by the method and apparatus of this invention is illustrated in FIGS. 18a–18c. FIG. 18a illustrates a partial schematic view of the tracks made by nuclear particles in a cloud chamber which are used to identify the particles involved in a nuclear reaction. Analysis of the length, direction and curvature of such tracks, as well as consideration of other phenomena, such as track intersections, etc., yields much information as to the nature of nuclear particles and of nuclear reactions. An example of use of the concept of connectivity through a neighborhood to assist in the evaluation of these photographs is that of determining whether the tracks 201 and 202, shown in FIG. 18b, are the result of the same particle or not. The two arcs are separated but appear as though they might be due to the same particle. It is extremely difficult, by conventional means, to determine with expediency whether or not the two tracks are a continuation of one another. Therefore, the analysis of all data acquired in a given experiment may be very lengthy or, in some cases, some data may be omitted completely. This is particularly undesirable in the case of nuclear reactions which may occur only a few times in a great many photographs.

In the processing field of this invention, either of the arcs may be extended at substantially consistent curvature so that a determination can readily be made as to whether or not the second curve is simply an extension of the first. To accomplish this, as shown in FIG. 18b, the computer is programmed to construct the minimum parallelogram, 203, about one of the curves, 201. As long as the arc is small, a measure of the curvature is given with fair uniformity by the following equation:

$$C = \frac{A_1 - A_2}{L^3}$$

where:
 C = curvature;
 $A_1$ = number of points between the concave side of the arc and the parallelogram;
 $A_2$ = number of points between the convex side of the arc and within the parallelogram; and
 L = the length of the arc.

Next, the computer adds a 1 to each of the points in the neighborhood of the last element in the arc 201 at the end adjacent arc 202. For each of these points, a new parallelogram including the new point is formed and a new measure of the curvature is computed. These values are each compared with the value computed for the curve as originally reproduced in the field. The one of the five comparisons which produces the closest match identifies the location of the subelement which most appropriately extends the arc so as to continue its original curvature. Thus, by repeating this process a sufficient number of times, the arc can be extended until, as shown in FIG. 18c, the dotted extension 204 is filled in and it becomes apparent that, in the illustrated case, the two arcs are of different curvature and, therefore, must correspond to different particles. Computer recognition of this result is established from a measure of the number of points enclosed within a triangle formed by the two arcs and the shortest line which joins the extension 204 to the arc 202. If the computer determines that this triangle never includes any points of value 0, or if the number of points of value 0 remains very small, the two arcs correspond to a single particle. On the other hand, if the two arcs are such that the number of points of 0 value in the triangle increases as the extension 204 is lengthened, then the curvatures are known to be different and the two arcs correspond to different particles. Although this problem remains relatively complex even utilizing the six nearest neighbor logic of this invention, it is substantially simpler than that required in other two-dimensional systems.

In addition to the specific illustrations of blood cell counting and cloud chamber tracking given above, many other applications of two-dimensional data processing, including both pattern recognition and other types of processing, are suitable for the application of the processing system and method of this invention.

The manner of processing two-dimensional information in accord with this invention is based in part upon a unique capability of the field pattern illustrated in FIGS. 2 and 3 which permits a determination to be made as to the connectivity of information through an element on the basis of the condition of its six immediate neighboring elements. As previously noted, neighborhoods of index 0–6 indicate that the central element is not needed for connectivity while neighborhoods of index 7–13 indicate that the central element is required for connectivity. This capability is basic to a simplified form of processing so that the complexity of dealing with a given set of information is greatly reduced and the time required for programming and processing is also reduced. It should also be noted that the information considered as being continuous through a neighborhood may be either positive (1's) or negative (0's) since knowledge of the connectivity of negative information is equivalent to knowledge that the positive information is discontinuous.

In addition, the six nearest neighbor logic is unique in that each neighborhood is rotationally symmetric about its central element so that any given pattern of information is treated identically, regardless of its orientation in the field.

Various changes and modifications may be made in the method and apparatus described herein with respect to specific illustrative embodiments described above within the scope of the invention as defined by the following claims.

What is claimed is:
1. Apparatus for analyzing two dimensional image comprising:
 a. means for converting the image to a binary image which is defined by a first field of image elements with each image element surrounded by six other elements;
 b. means for storing representations of the binary image elements of said first field;
 c. means for determining with respect to each element which is not at the edge of the field the pattern of the actual states of the six neighboring elements surrounding it;
 d. means for comparing said pattern of states of said neighboring elements surrounding the respective element with at least one of the possible alternative patterns of states of said six neighboring elements;
 e. means for fixing each element in said first field in a predetermined state when correspondence is found between the patterns of states of the neighboring elements surrounding its corresponding element in the first field of elements between the pattern of states of said neighboring elements and one of said possible patterns with which it is compared; and
 f. means for providing an output representative of the state of the elements of said first field after fixing.

2. Apparatus according to claim 1 further including means for storing representations of a second field having elements corresponding to those in said first field, means to cause said means for fixing to selectively fix elements in said first and second fields and means to selectively provide an output representative of the state of the elements of said first and second fields.

3. Apparatus according to claim 2 and further including means to acquire said image.

4. Apparatus according to claim 1 for analyzing white blood cells and further including a microscope for acquiring at least one blood cell and wherein said means for converting the image to a binary image comprises means to convert said blood cell to a binary image.

5. Apparatus according to claim 1 wherein said elements are divided into subfields such that no adjacent elements in the field are in the same subfield and further including means to cause said means for determining, means for comparing and means for fixing to operate in succession upon each of said subfields.

6. Apparatus for processing two-dimensional data comprising:
   a. field of electrical elements disposed in a two-dimensional array, each of said elements having alternative stable states;
   b. each of said elements including electrical circuit connections for transmitting an indication of its state of its nearest neighbor elements around it in the field;
   c. each element, which is not at the edge of the field including circuit input connections for receiving indications of the states of the six nearest neighbor elements surrounding it;
   d. electrical connections for placing each element in a predetermined state for forming a pattern of information on the field;
   e. each element except those at the edge of the field being electrically connected to surround shift register and incorporating electrical circuits for comparing the pattern of states of its said six neighbor elements with at least one preselected pattern of possible states of said six neighbor elements; and
   f. automatically operating electrical circuits within each element for fixing each element in a predetermined state when the pattern of states of its six neighbor elements corresponds to a preselected pattern of possible states of said six neighbor elements.

7. The apparatus of claim 6 in which:
   a. said surround shift register retains at least one said preselected pattern of possible states of six elements surrounding another element and has six outputs to each element, the outputs being respectively for signals indicating the states of said preselected patterns;
   b. each of said element not at the edge of the field having six first inputs connected for receiving signals respectively from said outputs of the register and six second inputs respectively for receiving signals indicating the actual states of said six nearest neighbor elements surrounding it;
   c. said register being operable for sequentially shifting said pattern of states around its said six outputs; and
   d. each element not at the edge of the field including electrical circuitry responsive to a correspondence of signals received at its said six first and its said six second outputs for producing an output signal when there is a correspondence of said signals to the first and second inputs.

8. The apparatus of claim 7 comprising:
   a. each element except those at the edge of the field including circuitry for producing an internal signal when the pattern of states of its said six nearest neighbor elements matches one said preselected pattern of possible states;
   b. each element except those at the edge of the field including circuitry for fixing its state as a function of its own state and of the states of its said six nearest neighbors, as indicated by said internal signal; and
   c. control components connected for actuating the elements to communicate their respective states to each other, for actuating each element's said pattern comparing circuitry and for actuating said state fixing circuitry of the elements.

9. The apparatus of claim 8 in which the elements are divided into subfields such that no adjacent elements in the field are in the same subfield and which includes:
   a. an instruction circuit operatively connectable for initiating said comparing and state fixing operations in all the elements of one subfield, and then for initiating said comparing and state fixing operations in all the elements in each of the other subfields in succession;
   b. said control components being connected for actuating said instruction means.

10. Apparatus according to claim 9 in which the elements are divided alternatively into sets of three, four and seven subfield, and in which said instruction circuit is operably connectable alternatively to one of said sets for sending said actuating signals in succession to all the elements in a selected set, said control components also being connected for designating a selected one of said alternative connections of the instruction circuit for initiating said operations in the elements of each of one of said sets of subfields in succession.

11. Apparatus for processing two-dimensional data comprising:
   a. a field of electrical, electrically interconnected elements each consisting of at least two subelements with each subelement having alternative stable states, comparable subelements of all the elements being disposed respectively in two-dimensional arrays, thereby providing at least two similar two-dimensional arrays;
   b. each subelement including means for transmitting an indication of its state to other subelements of the element of which it is a part and for receiving an indication of the state of each of the other subelements of the same element;
   c. each subelement of each array including means for transmitting an indication of its state to its nearest neighbor subelement around it in the same array;
   d. each subelement of each array except those at the edge of the array including means for receiving indications of the states of the six nearest neighbor subelements surrounding it in the same array;
   e. means for placing each subelement of a selected array in a predetermined state for forming a pattern of information on the array selected;
   f. means associated with each subelement of each array except those at the edges of the arrays for comparing the pattern of states of its said six nearest neighbor elements in the same array with at least one preselected pattern of possible states of said six neighbor elements;
   g. each subelement except those at the edges of the arrays including means connected for producing an internal signal when the pattern of states of its said six nearest neighbor elements matches one said preselected pattern of possible states;

h. each subelement except those at the edges of the arrays including circuitry for fixing its state as a function of its own state, of the state of other subelements, in other arrays, of the element of which is a part, and of the states of its six nearest neighbor subelements in the same array as indicated by said internal signal;

i. means for placing each subelement of a selected array in a predetermined state for forming a pattern of information on the array; and j. control means for actuating all the subelements to communicate their respective states to each other in the respective arrays and to the other subelements of the same element for actuating said associated means to perform said pattern comparing for each of a selected array, and for actuating said state fixing circuitry of the subelements of a selected array.

12. Apparatus according to claim 11 including control means for placing subelements of a selected array respectively in states, which are functions of the states of subelements of the same elements in at least one other similar array.

13. Apparatus according to claim 12 in which the elements are divided into subfields such that no adjacent elements in the field and no adjacent subelements in the arrays are in the same subfield and which includes instruction means operatively connectable in sequence to all the subelements of the elements of the respective subfields for sending an actuating signal first to all the subelements of the elements in one subfield for initiating said comparing and state fixing operations on those subelements, and then for sending said actuating signal in succession to all the subelements of the elements in each of the other subfields said control means being connected for actuating said instruction means.

14. Apparatus for analyzing a two dimensional image comprising:

a. means for converting the image to a plurality of binary electrical signals each signal representing an image element, to define a first field of image elements with each image element surrounded by six other elements;

b. first means, electrically coupled to said means for converting, for storing said signals representing the image elements of said first field;

c. means, electrically coupled to said means for storing, for determining from said signals, with respect to each element which is not at the edge of the field, the pattern of the actual binary states of the six neighboring elements surrounding it;

d. means, electrically coupled to said means for determining, for comparing said pattern of actual states of said neighboring elements surrounding the respective element with at least one of the possible alternative patterns of states of said six neighboring elements;

e. means, having electrical inputs from said means for comparing, for fixing each element in said first field in a predetermined binary state when correspondence is found between the pattern of states of the neighboring elements surrounding it and one of said possible patterns with which it is compared; and f. means, obtaining electrical inputs from said means for storing for providing an output representative of the state of the elements of said first field after fixing.

15. Apparatus according to claim 14 further including second means for storing binary signal representing a second field having elements corresponding to those in said first field, means to cause said means for fixing to selectively be coupled to fix elements in said first and second fields and means to selectively couple said first and second means for storing to said means for providing an output to thereby provide an output representative of the state of the elements of said first and second fields.

16. Apparatus according to claim 15 and further including means to acquire said image.

* * * * *

UNITED STATES PATENT AND TRADEMARK OFFICE
CERTIFICATE OF CORRECTION

PATENT NO. : 4,060,713

DATED : November 29, 1977

INVENTOR(S) : Marcel J.E. Golay

It is certified that error appears in the above-identified patent and that said Letters Patent are hereby corrected as shown below:

Column 3, line 4, change "if" to --whether--.

Column 7, line 53, change "subscrips" to --Subscript--.

Column 9, line 30, change "he" to --the--.

Column 10, line 47, change "r" to --$\bar{r}$--.

Column 10, line 59, after "subsequently" insert --described--

Column 11, line 3, change "s" to --$\bar{s}$--.

Column 14, line 55, change "∅" to --0--.

Column 15, line 61, after "1101-1164" insert --.--.

Column 19, line 37, after "operation" insert --is--.

Column 20, line 13, after "hereinafter," insert --the location,--

UNITED STATES PATENT AND TRADEMARK OFFICE
CERTIFICATE OF CORRECTION

PATENT NO. : 4,060,713

DATED : November 29, 1977

INVENTOR(S) : Marcel J.E. Golay

It is certified that error appears in the above-identified patent and that said Letters Patent are hereby corrected as shown below:

Column 21, line 45, "change neighborhood" to --neighbor--.

Column 30, line 21, change "comprising" to --comparing--.

Signed and Sealed this

Thirteenth Day of June 1978

[SEAL]

Attest:

RUTH C. MASON
*Attesting Officer*

DONALD W. BANNER
*Commissioner of Patents and Trademarks*